US012447352B2

(12) United States Patent
Engman et al.

(10) Patent No.: US 12,447,352 B2
(45) Date of Patent: Oct. 21, 2025

(54) CONFIGURABLE COMPARATOR ECG STORAGE AND DISPLAY IN A WEARABLE DEFIBRILLATOR SYSTEM

(71) Applicant: West Affum Holdings DAC, Dublin (IE)

(72) Inventors: Zoie R. Engman, Kirkland, WA (US); Pamela F. Breske, Newcastle, WA (US); Joseph L. Sullivan, Kirkland, WA (US)

(73) Assignee: West Affum Holdings DAC, Dublin (IE)

( * ) Notice: Subject to any disclaimer, the term of this patent is extended or adjusted under 35 U.S.C. 154(b) by 678 days.

(21) Appl. No.: 17/691,694

(22) Filed: Mar. 10, 2022

(65) Prior Publication Data

US 2022/0288403 A1 Sep. 15, 2022

Related U.S. Application Data

(60) Provisional application No. 63/159,349, filed on Mar. 10, 2021.

(51) Int. Cl.
*A61N 1/39* (2006.01)
*A61B 5/00* (2006.01)
(Continued)

(52) U.S. Cl.
CPC .......... *A61N 1/3937* (2013.01); *A61B 5/0006* (2013.01); *A61B 5/02455* (2013.01);
(Continued)

(58) Field of Classification Search
CPC .. A61N 1/3937; A61N 1/3925; A61N 1/3904; A61N 1/39044; A61B 5/0006;
(Continued)

(56) References Cited

U.S. PATENT DOCUMENTS 3,724,355 A 4/1973 Busch et al.
3,724,455 A 4/1973 Unger
(Continued)

FOREIGN PATENT DOCUMENTS

DE 102005060985 A1 6/2007
EP 2305110 A1 4/2011
(Continued)

OTHER PUBLICATIONS

Klein, H. U., Goldenberg I., & Moss, A. J., Risk Stratification for Implantable Cardioverter Defibrillator Therapy: The Role of the Wearable Cardioverter-Defibrillator, Clinical update, European Heart Journal, May 31, 2013, pp. 1-14, doi:10.1093/eurheartj/eht167, European Society of Cardiology.
(Continued)

*Primary Examiner* — Mark W. Bockelman
(74) *Attorney, Agent, or Firm* — Polsinelli PC

(57) ABSTRACT

Technologies and implementations for a wearable healthcare system including a remote device, a server, and a configurable comparator module (CCM). The CCM may be configured to facilitate communication between the server and a remote device. A wearable medical device (WMD) may be configured to provide electrocardiogram (ECG) data to the server. The CCM may be configured capture one or more portions of the ECG data to be configured and compared at the remote device. Accordingly, the CCM may be configured to display the one or more portions at the remote device capable of being utilized by a person at the remote device.

22 Claims, 12 Drawing Sheets

(51) Int. Cl.
  *A61B 5/0245*  (2006.01)
  *A61B 5/352*  (2021.01)
  *A61B 5/361*  (2021.01)
  *A61B 5/363*  (2021.01)

(52) U.S. Cl.
  CPC .............. *A61B 5/352* (2021.01); *A61B 5/361* (2021.01); *A61B 5/363* (2021.01)

(58) Field of Classification Search
  CPC ..... A61B 5/02455; A61B 5/352; A61B 5/361; A61B 5/363; A61B 5/256; A61B 5/282
  See application file for complete search history.

(56) References Cited

U.S. PATENT DOCUMENTS

| | | |
|---|---|---|
| 4,583,524 A | 4/1986 | Hutchins |
| 4,619,265 A | 10/1986 | Morgan et al. |
| 4,666,432 A | 5/1987 | McNeish et al. |
| 4,698,848 A | 10/1987 | Buckley |
| 4,896,677 A * | 1/1990 | Kaneko .......... A61B 5/336 600/509 |
| 4,928,690 A | 5/1990 | Heilman et al. |
| 4,955,381 A | 9/1990 | Way et al. |
| 5,078,134 A | 1/1992 | Heilman et al. |
| 5,228,449 A | 7/1993 | Christ et al. |
| 5,348,008 A | 9/1994 | Bornn et al. |
| 5,353,793 A | 10/1994 | Bornn |
| RE34,800 E | 11/1994 | Hutchins |
| 5,394,892 A | 3/1995 | Kenny |
| 5,405,362 A | 4/1995 | Kramer et al. |
| 5,429,593 A | 7/1995 | Matory |
| 5,474,574 A | 12/1995 | Payne et al. |
| 5,618,208 A | 4/1997 | Crouse et al. |
| 5,662,690 A | 9/1997 | Cole et al. |
| 5,708,978 A | 1/1998 | Johnsrud |
| 5,741,306 A | 4/1998 | Glegyak et al. |
| 5,782,878 A | 7/1998 | Morgan et al. |
| 5,792,204 A | 8/1998 | Snell |
| 5,902,249 A | 5/1999 | Lyster |
| 5,913,685 A | 6/1999 | Hutchins |
| 5,944,669 A | 8/1999 | Kaib |
| 6,047,203 A | 4/2000 | Sackner et al. |
| 6,065,154 A | 5/2000 | Hulings et al. |
| 6,108,197 A | 8/2000 | Janik |
| 6,148,233 A | 11/2000 | Owen et al. |
| 6,201,992 B1 | 3/2001 | Freeman |
| 6,263,238 B1 | 7/2001 | Brewer et al. |
| 6,280,461 B1 | 8/2001 | Glegyak et al. |
| 6,287,328 B1 | 9/2001 | Snyder et al. |
| 6,304,780 B1 | 10/2001 | Owen et al. |
| 6,319,011 B1 | 11/2001 | Motti et al. |
| 6,334,070 B1 | 12/2001 | Nova et al. |
| 6,356,785 B1 | 3/2002 | Snyder |
| 6,427,083 B1 | 7/2002 | Owen et al. |
| 6,437,083 B1 | 8/2002 | Brack et al. |
| 6,450,942 B1 | 9/2002 | Lapanashvili et al. |
| 6,529,875 B1 | 3/2003 | Nakajima |
| 6,546,285 B1 | 4/2003 | Owen et al. |
| 6,671,545 B2 | 12/2003 | Fincke |
| 6,681,003 B2 | 1/2004 | Inder et al. |
| 6,762,917 B1 | 7/2004 | Verbiest et al. |
| 7,065,401 B2 | 6/2006 | Worden |
| 7,099,715 B2 | 8/2006 | Korzinov et al. |
| 7,212,850 B2 | 5/2007 | Prystowsky et al. |
| 7,559,902 B2 | 7/2009 | Ting et al. |
| 7,587,237 B2 | 9/2009 | Korzinov et al. |
| 7,753,759 B2 | 7/2010 | Pintor et al. |
| 7,865,238 B2 | 1/2011 | Brink |
| 7,870,761 B2 | 1/2011 | Valentine et al. |
| 7,907,996 B2 | 3/2011 | Prystowsky et al. |
| 7,941,207 B2 | 5/2011 | Korzinov |
| 7,974,689 B2 | 7/2011 | Volpe et al. |
| 8,135,462 B2 | 3/2012 | Owen et al. |
| 8,140,154 B2 | 3/2012 | Donnelly et al. |
| 8,369,944 B2 | 2/2013 | Macho et al. |
| 8,527,028 B2 | 9/2013 | Kurzweil et al. |
| 8,548,557 B2 | 10/2013 | Garstka et al. |
| 8,560,044 B2 | 10/2013 | Kurzweil et al. |
| 8,615,295 B2 | 12/2013 | Savage et al. |
| 8,644,925 B2 | 2/2014 | Volpe et al. |
| 8,676,313 B2 | 3/2014 | Volpe et al. |
| 8,706,255 B2 | 4/2014 | Phillips et al. |
| 8,742,349 B2 | 6/2014 | Urbon et al. |
| 8,897,860 B2 | 11/2014 | Volpe et al. |
| 8,904,214 B2 | 12/2014 | Volpe et al. |
| 8,965,500 B2 | 2/2015 | Macho et al. |
| 9,008,801 B2 | 4/2015 | Kaib et al. |
| 9,084,583 B2 | 7/2015 | Mazar et al. |
| 9,089,685 B2 | 7/2015 | Sullivan et al. |
| 9,119,547 B2 | 9/2015 | Cazares et al. |
| 9,131,901 B2 | 9/2015 | Volpe et al. |
| 9,132,267 B2 | 9/2015 | Kaib |
| 9,265,432 B2 | 2/2016 | Warren et al. |
| 9,345,898 B2 | 5/2016 | Piha et al. |
| 9,408,548 B2 | 8/2016 | Volpe et al. |
| 9,445,719 B2 | 9/2016 | Libbus et al. |
| 9,454,219 B2 | 9/2016 | Volpe et al. |
| 9,579,020 B2 | 2/2017 | Libbus et al. |
| 9,592,403 B2 | 3/2017 | Sullivan |
| 9,598,799 B2 | 3/2017 | Shoshani et al. |
| 9,675,804 B2 | 6/2017 | Whiting et al. |
| 9,724,008 B2 | 8/2017 | Sullivan et al. |
| 9,878,171 B2 | 1/2018 | Kaib |
| 9,895,105 B2 | 2/2018 | Romem |
| 9,901,741 B2 | 2/2018 | Chapman et al. |
| RE46,926 E | 7/2018 | Bly et al. |
| 10,016,613 B2 | 7/2018 | Kavounas |
| 10,076,656 B2 | 9/2018 | Dar et al. |
| 10,192,387 B2 | 1/2019 | Brinig et al. |
| 10,307,133 B2 | 6/2019 | Kaib |
| 10,463,867 B2 | 11/2019 | Kaib et al. |
| 10,589,110 B2 | 3/2020 | Oskin et al. |
| 10,599,814 B2 | 3/2020 | Landrum et al. |
| 2002/0181680 A1 | 12/2002 | Linder et al. |
| 2003/0158593 A1 | 8/2003 | Heilman et al. |
| 2005/0107833 A1 | 5/2005 | Freeman et al. |
| 2005/0107834 A1 | 5/2005 | Freeman et al. |
| 2006/0173499 A1 | 8/2006 | Hampton et al. |
| 2008/0312709 A1 | 12/2008 | Volpe et al. |
| 2009/0005827 A1 | 1/2009 | Weintraub et al. |
| 2010/0007413 A1 | 1/2010 | Herleikson |
| 2010/0298899 A1 | 11/2010 | Donnelly et al. |
| 2011/0022105 A9 | 1/2011 | Owen et al. |
| 2011/0288604 A1 | 11/2011 | Kaib et al. |
| 2011/0288605 A1 | 11/2011 | Kaib et al. |
| 2012/0112903 A1 | 5/2012 | Kaib et al. |
| 2012/0144551 A1 | 6/2012 | Guldalian |
| 2012/0150008 A1 | 6/2012 | Kaib et al. |
| 2012/0158075 A1 | 6/2012 | Kaib et al. |
| 2012/0191476 A1 | 7/2012 | Reid et al. |
| 2012/0265265 A1 | 10/2012 | Razavi et al. |
| 2012/0283794 A1 | 11/2012 | Kaib et al. |
| 2012/0293323 A1 | 11/2012 | Kaib et al. |
| 2012/0302860 A1 | 11/2012 | Volpe et al. |
| 2012/0310315 A1 | 12/2012 | Savage et al. |
| 2013/0085538 A1 | 4/2013 | Volpe et al. |
| 2013/0144355 A1 | 6/2013 | Macho et al. |
| 2013/0231711 A1 | 9/2013 | Kaib |
| 2013/0245388 A1 | 9/2013 | Rafferty et al. |
| 2013/0274565 A1 | 10/2013 | Langer et al. |
| 2013/0317852 A1 | 11/2013 | Worrell et al. |
| 2013/0325078 A1 | 12/2013 | Whiting et al. |
| 2014/0012144 A1 | 1/2014 | Crone |
| 2014/0025131 A1 | 1/2014 | Sullivan et al. |
| 2014/0046391 A1 | 2/2014 | Cowan et al. |
| 2014/0070957 A1 | 3/2014 | Longinotti-Buitoni et al. |
| 2014/0163663 A1 | 6/2014 | Poddar et al. |
| 2014/0324112 A1 | 10/2014 | Macho et al. |
| 2014/0378812 A1 | 12/2014 | Saroka et al. |
| 2015/0039053 A1 | 2/2015 | Kaib et al. |
| 2015/0161554 A1 | 6/2015 | Sweeney et al. |
| 2015/0243040 A1* | 8/2015 | Ben-Oni .......... A61B 5/318 345/629 |

(56) References Cited

U.S. PATENT DOCUMENTS

| | | |
|---|---|---|
| 2015/0297135 A1 | 10/2015 | Shoshani et al. |
| 2015/0328472 A1 | 11/2015 | Sullivan et al. |
| 2016/0004831 A1 | 1/2016 | Carlson et al. |
| 2016/0076175 A1 | 3/2016 | Rock et al. |
| 2016/0076176 A1 | 3/2016 | Rock et al. |
| 2016/0082277 A1 | 3/2016 | Foshee, Jr. et al. |
| 2016/0113581 A1 | 4/2016 | Amir et al. |
| 2016/0256104 A1 | 9/2016 | Romem et al. |
| 2016/0283900 A1 | 9/2016 | Johnson et al. |
| 2017/0014073 A1 | 1/2017 | Shoshani et al. |
| 2017/0027469 A1 | 2/2017 | Amir et al. |
| 2017/0036066 A1 | 2/2017 | Chahine |
| 2017/0040758 A1 | 2/2017 | Amir et al. |
| 2017/0162840 A1 | 6/2017 | Pendry |
| 2017/0319862 A1 | 11/2017 | Foshee, Jr. et al. |
| 2017/0367591 A1 | 12/2017 | Jorgensen |
| 2018/0116537 A1 | 5/2018 | Sullivan et al. |
| 2018/0117299 A1 | 5/2018 | Gustavson et al. |
| 2018/0184933 A1 | 7/2018 | Sullivan et al. |
| 2018/0185662 A1 | 7/2018 | Foshee, Jr. et al. |
| 2018/0243578 A1 | 8/2018 | Volosin |
| 2018/0361165 A1 | 12/2018 | Jaax et al. |
| 2019/0030352 A1 | 1/2019 | Sullivan et al. |
| 2019/0076666 A1 | 3/2019 | Medema |
| 2019/0116896 A1 | 4/2019 | Armour et al. |
| 2019/0321650 A1 | 10/2019 | Raymond et al. |

FOREIGN PATENT DOCUMENTS

| | | |
|---|---|---|
| EP | 3380189 B1 | 10/2018 |
| JP | 4320257 B2 | 8/2009 |
| JP | 2014526282 A | 10/2014 |
| JP | 5963767 B2 | 8/2016 |
| WO | 1998039061 A2 | 9/1998 |
| WO | 2011/146448 A1 | 11/2011 |
| WO | 2012064604 A1 | 5/2012 |
| WO | 2012/151160 A1 | 11/2012 |
| WO | 2015/056262 A1 | 4/2015 |

OTHER PUBLICATIONS

Lifecor LifeVest System Model WCD 3100 Operator's Manual, 2006, PN 20B0040 Rev FI, Zoll Lifecor Corporation, Pittsburgh, PA.

LifeVest Model 4000 Patient Manual, Zoll, 2009, PN 20B0047 Rev B.

Heartstart MRx and XL AED Algorithm—Application Note, Jul. 2001, Edition 2 Philips Healthcare, USA.

The LifeVest Network/Patient Data Management System, Zoll, 2015, 20C0503 Rev A.

Metting Van Rijn, A. C., Peper A., & Grimbergen, C. A., High-Quality Recording of Bioelectric Events Part 1: Interference Reduction, Theory and Practice, Review, Medical & Biological Engineering & Computing, Sep. 1990, pp. 389-397, IFMBE.

Pagan-Carlo, et al., "Encircling Overlapping Multipulse Shock Waveforms for Transthoracic Defibrillation," JACC Journals, Dec. 1998, vol. 32 Issue 7, p. 2065-2071.

Zoll, LifeVest, Proven protection from Sudden Cardiac Death, 2017, 4 pages. Pittsburgh PA, USA.

International Search Report and Written Opinion for PCT Application No. PCT/US2015/051726, dated May 20, 2016, European Patent Office, Rijswijk, 11 pages.

* cited by examiner

700 A computer program product

702 A signal bearing medium 704 at least one of
    machine readable non-transitory medium having stored therein instructions that, when executed by one or more processors, operatively enable a configurable comparator module (CCM) to:
        capture a first portion of an ECG data based on a predetermined parameter, the first portion indicative of a non-episode portion of the ECG data;
        capture a second portion of the ECG data, the second portion indicative of an episode portion of the ECG data; and
        cause to display the first portion and the second portion concurrently for comparison by a user for use in a medical diagnosis.

| 706 a computer-readable medium | 706 a recordable medium | 710 a communications medium |

Figure 7

CONFIGURABLE COMPARATOR ECG STORAGE AND DISPLAY IN A WEARABLE DEFIBRILLATOR SYSTEM

RELATED APPLICATION

This application claims benefit of priority to U.S. Provisional Patent Application Ser. No. 63/159,349, filed on Mar. 10, 2021, titled CONFIGURABLE COMPARATOR ECG STORAGE AND DISPLAY IN A WEARABLE DEFIBRILLATOR SYSTEM, which is incorporated herein by reference in its entirety for all purposes.

INFORMATION

Unless otherwise indicated herein, the approaches described in this section are not prior art to the claims in this application and are not admitted to be prior art by inclusion in this section.

Technology has contributed to improvements in healthcare. Some examples include healthcare related devices that may be capable of determining various health related information about a person. For example, a healthcare device may be capable of determining health related information of an electrical activity of a person. The electrical activities of the person may include various electrical activities of various organs such as, but not limited to, brain activities, heart activities, skin moisture, gastrointestinal tract activities, breathing activities, and so forth.

The healthcare device may be included as part of a wearable system, where the wearable system may include a healthcare device configured to be worn by a person (e.g., a wearable medical device or a WMD) facilitating a more continuous monitoring and/or treatment of various health related issues of the person. For example, the WMD may be configured to monitor the electrical activities and/or treat potential health related issues of the heart. An example of a WMD for monitoring the electrical activities of the heart may be wearable cardioverter defibrillator (WCD).

The wearable system having the WMD may receive and store a variety of information about the health of the person and any treatment that may have been administered to the person by the WMD. The variety of information may be informative to various people that may interact with the person (e.g., first responder, medical personnel, medical professional, etc.). For example, the electrical activities of the heart may be captured by the WMD in the form of electrocardiogram (ECG) data. The ECG data may be of informative to a medical professional (e.g., a doctor), where the person may be a patient of the doctor.

All subject matter discussed in this section of this document is not necessarily prior art and may not be presumed to be prior art simply because it is presented in this section. Plus, any reference to any prior art in this description is not and should not be taken as an acknowledgement or any form of suggestion that such prior art forms parts of the common general knowledge in any art in any country. Along these lines, any recognition of problems in the prior art are discussed in this section or associated with such subject matter should not be treated as prior art, unless expressly stated to be prior art. Rather, the discussion of any subject matter in this section should be treated as part of the approach taken towards the particular problem by the inventor(s). This approach in and of itself may also be inventive. Accordingly, the foregoing summary is illustrative only and not intended to be in any way limiting. In addition to the illustrative aspects, embodiments, and features described above, further aspects, embodiments, and features will become apparent by reference to the drawings and the following detailed description

SUMMARY

Described herein are various illustrative wearable medical device (WMD) systems and methods for configurable comparisons of portions of electrocardiogram (ECG) data. Example WMD systems may include a configurable comparator module (CCM) that may be configured to capture a portion of an ECG data. In some examples, the CCM may be configured to capture the first portion of the ECG data based on a predetermined parameter. Example WMD systems may include the CCM configured to capture a second portion of the ECG data. The CCM may be configured to cause to display the first portion and the second portion concurrently for comparison by a user.

The foregoing summary is illustrative only and not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

Subject matter is particularly pointed out and distinctly claimed in the concluding portion of the specification. The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

FIG. 7 illustrates an example computer program product 700, arranged in accordance with at least some embodiments described herein.

DETAILED DESCRIPTION

Figure 1:
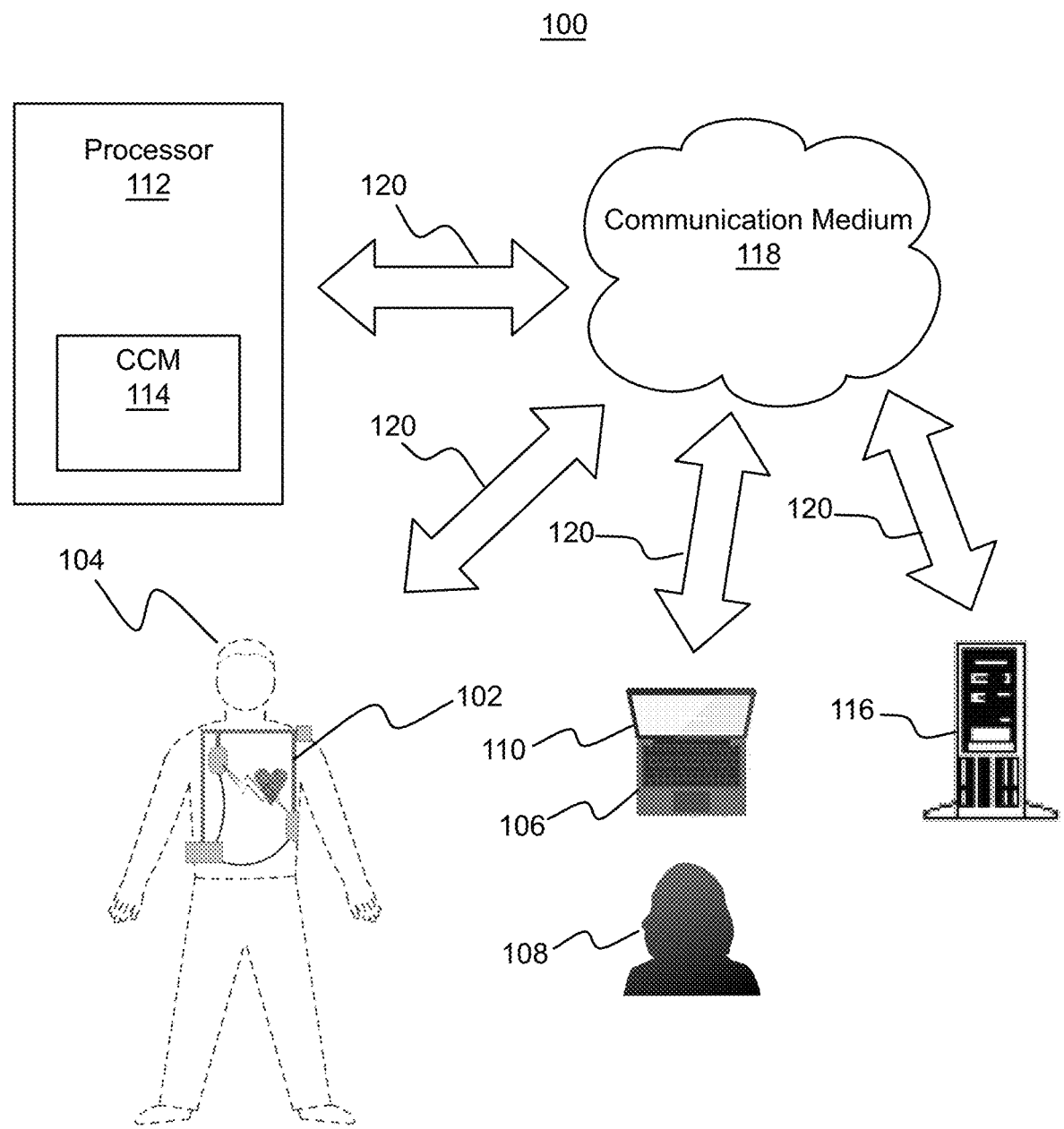
FIG. 1 illustrates a wearable medical device (WMD) system in accordance with various embodiments.

The following description sets forth various examples along with specific details to provide a thorough understanding of claimed subject matter. It will be understood by those skilled in the art after review and understanding of the present disclosure, however, that claimed subject matter may be practiced without some or more of the specific details disclosed herein. Further, in some circumstances, well-known methods, procedures, systems, components and/or circuits have not been described in detail in order to avoid unnecessarily obscuring claimed subject matter.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated and make part of this disclosure.

This disclosure is drawn, inter alia, to methods, apparatus, and wearable medical device (WMD) systems related to facilitating analysis of portions of electrocardiogram (ECG) data of a heart of a person (e.g., patient) wearing a wearable medical device (WMD). The portions of the ECG data may be acquired during various times (e.g., during a normal rhythm of the heart and/or during an event of the rhythm of the heart). The portions may be captured by a configurable comparator module (CCM), where the CCM may be configured to facilitate analysis of portions of the ECG data. In order to facilitate the analysis of the portions of the ECG data, the CCM may be configured to cause the portions of the ECG data to be displayed on a user interface (e.g., a display device) at a remote device, where the remote device may be utilized by a remote user such as, but not limited to, a healthcare professional (e.g., a doctor). As a result, the analysis and/or monitoring of the patient by the doctor may be facilitated.

In one example, the WMD system may be configurable to enable the remote device to display portions of the ECG signals of the patient acquired during potential arrhythmia events and/or at other times (e.g., during normal sinus rhythm) for comparison. In another example, the doctor may be provided the capabilities of selecting a particular portion of the ECG data for comparison with the ECG data during the potential arrhythmia event. An example of the capabilities of selecting the particular portion of the ECG data by the doctor may including the capabilities of overlaying the ECG portions. In yet another example, the WMD system may be configured to automatically identify selected rhythms (e.g., normal sinus rhythm, rhythms during exercise, rhythms during sleep, sitting, or during different postures, etc.) included in the ECG data of the patient and capture and save a portion of such normal sinus rhythm ECG data to be utilized later for comparison with the ECG data of a potential arrhythmia.

Various communication technologies may provide an opportunity for remote monitoring of healthcare. For example, remote monitoring of healthcare may include monitoring of a health condition of the patient, who may use a medical device at their residence. In the example of remote monitoring of healthcare, a healthcare professional (e.g., a doctor located at a remote location) may find useful various information available from the healthcare device. For example, from the remote location, the doctor may receive information from the healthcare device that may cause the doctor to adjust medication of the person and/or alert the doctor to a potential medical condition of the patient.

For the purposes of providing a detailed description of the claimed subject matter, utilization of healthcare device may include a WMD and may be described as included in the WMD systems of the present disclosure. However, in various embodiments, the WMD systems of the present disclosure may include a variety of wearable devices such as, but not limited to, cardiac event monitors, Holter monitors, mobile cardiac telemetry (MCT) devices, brain activity monitors, wearable cardioverter defibrillators (WCDs), mobile devices (e.g., a mobile/smart phones), and so forth. Accordingly, the claimed subject matter is not limited in this respect.

Utilizing the example of the WMD system including the WMD, the WMD may be configured to facilitate monitoring of electrical signals such as, but not limited to, monitoring of electrical signals from a heart of a person. For example, the WMD may be configured to monitor and treat potential issues with the heart (i.e., the patient may have a health condition, where the electrical control system of the heart may malfunction causing the heart to beat irregularly or not at all). In some examples, these types of WMDs may include a defibrillator device. An example of a WMD, which may be configured to monitor and treat potential issues with the heart, may include a wearable cardioverter defibrillator (WCD). In the present disclosure, for the purposes of ease of understanding the various embodiments of the claimed subject matter, references may be made to a medical device such as, but not limited to, a WCD.

As part of the description of utilization of the WCD, some issues with the heart may be briefly described. For example, some issues with the rate of the heartbeat may be generally referred to as an arrhythmia. Arrhythmia may be caused by many factors, but in general, an arrhythmia may be caused by a malfunction in the electrical control system of the heart. Some types of arrhythmias may result in inadequate blood flow resulting in reduction or lack of the amount of blood pumped to the various parts of the body. For example, issues with the sinoatrial (SA) node may lead to arrhythmia of some kind. Some arrhythmias may lead to a condition known as sudden cardiac arrest (SCA). In an SCA condition, the heart may fail to pump blood effectively, and as a result, death may occur.

An example type of an arrhythmia, which may be associated with SCA, may be a condition known as ventricular fibrillation (VF). VF may be a condition where a ventricle or ventricles, which make up the heart to facilitate the pumping of blood, may make uncoordinated movements instead of steady rhythmic movements. In the VF condition, the heart may not pump adequate amounts of blood or may not pump blood at all, which may eventually lead to death. Another type of arrhythmia, which may be associated with SCA, may be a condition known as ventricular tachycardia (VT).

Turning back to the WCD, the WCD may be capable of monitoring the electrical signals of the heart and if necessary (e.g., a heart rhythm event), administer therapy to the heart in the form of an electric shock. The WCD may monitor the electrical signals and provide the electric shock to the heart externally (i.e., through the surface of a body) via components commonly known as electrodes, where some of the electrodes may be monitoring electrodes and some of the electrodes may be therapy electrodes. The WCD may be included in a support structure configured to be worn by the person. In this example, the WCD may help facilitate monitoring the electrical activities of the heart and provide the electric shock to the heart in the VF condition. As a result, the medical device may help prevent Sudden Cardiac Death (SCD).

Before turning to the figures, a non-limiting example scenario of utilization of various embodiments of WMD system may be described. In the non-limiting example scenario, the patient may have a heart condition, where the patient may utilize a healthcare device (e.g., the WCD). As mentioned, the WCD may include a support structure configured to be worn by the patient such as, but not limited to, a garment (e.g., a vest). Included in the support structure of the WCD, a WCD monitor may include various components to facilitate the functionality of the WCD. A number of electrodes, monitoring electrodes and therapy electrodes, may be communicatively coupled with the WCD monitor. As the patient wears the WCD, the WCD may receive various data from the person such as, but not limited to, electrical signals in the form of electrocardiogram (ECG) signals, and the ECG data may be stored by the WCD and/or communicated in accordance with various embodiments.

In one non-limiting example scenario, the WMD system may include the WCD communicatively coupled with a server type device (server), where the WCD and the server may be communicatively coupled with each other via some form of communication link such as, but not limited to, the Internet. Additionally, a remote device may be communicatively coupled with the server. The remote device may be configured to be utilized by a remote person (e.g., a healthcare professional such as, but not limited to, a doctor).

The WCD may be configured to securely communicate various health related information of the patient to the server. For example, the WCD may configured to securely communicate ECG data to the server. The ECG data may be securely accessed by the doctor utilizing the remote device. A configurable comparator module (CCM) may be communicatively coupled with the remote device. In one example, the CCM may be configured to capture a first portion of the ECG data based on a predetermined parameter, capture a second portion of the ECG data, and the CCM may be configured to cause to display the first portion and the second portion concurrently for comparison by the doctor.

The WMD system of the non-limiting example scenario may facilitate the remote device to acquire a "normal" ECG data for the patient to compare with other ECG data to facilitate determination of improving or worsening cardiac condition and/or determine various heart related conditions such as, but not limited to, supraventricular tachycardia (SVT) with a wide complex QRS from VT. The normal ECG data may be determined utilizing a baseline ECG measurement (e.g., measurement taken when the WCD is first provided to the patient), determined utilizing periodic snapshot episodes that may be acquired at a predetermined time(s) of day, and/or determined in the presence of a predetermined/specific rhythm. As a result, comparison of normal ECG with potential arrhythmias may be facilitated and/or improved, which may help facilitate at least the following: (1) "blindly" generating episodes at frequencies that may overload users such as physicians, clinicians, or other analysts (e.g., too much data may obscure the useful data or be too time consuming to effectively review); and (2) opening multiple episodes separately (or printing them out) for the user to manually compare ECG portions.

The remote device may include an interface that may be utilized by the doctor (e.g., a display device). Accordingly, the CCM may be configured to cause to display various information for the doctor. In one example, the CCM may be configured to cause to display various ECG data to facilitate selection of various portions of the ECG data for comparison by the doctor. In another example, the CCM may be configured to display various ECG data facilitate saving various comparisons. In yet another example, the CCM may be configured to display various ECG data to facilitate superimposing portions and/or complete ECG data captured at different times.

In some examples, the server may be a variety of computing devices that may be configured to provide server functionality. For example, the server may be a computing device configured to host a monitoring website that may facilitate an authorized user such as, but not limited to, the doctor or other health service provider to access information (e.g., ECG data) regarding the patient from the server. The remote device may be a wide variety of computing devices such as, but not limited to, personal communication devices, smart phones, tablets, and/or other smart devices that may have communication capabilities.

In some examples, the communication link may be wireless, wired, or any combination thereof. Accordingly, the WCD, the server, and/or the remote device may be configured to include wireless and/or wired communication capabilities. Some examples of wireless communication capabilities may include capabilities such as, but not limited to, Wi-Fi, Bluetooth, Near-Field Communication (NFC), Radio-frequency identification (RFID), various IEEE 802 based wireless communications including Zigbee, cellular wireless communication, etc. Additionally, in some examples, the CCM may be hosted on a device having communication capabilities such as, but not limited to, a smartphone type device, a tablet type device, a smartwatch type device, and so forth).

Turning to the Figures, FIG. 1 illustrates a wearable medical device (WMD) system in accordance with various embodiments. In FIG. 1, a wearable medical device (WMD) system 100 may include a wearable medical device (WMD) 102, which may be capable of being worn by a person (e.g., a patient 104, who may be wearing the wearable medical device 102). As show, the WMD system 100 may include a remote device 106 and a remote person (e.g., a doctor 108, who may be able to utilize the remote device 106 via an interface 110, for at least the various embodiments described herein). The WMD system 100 may include a processor 112, where the processor 112 may include a configurable comparator module (CCM) 114 configured to facilitate the various embodiments described herein. Additionally, the WMD system 100 may include a server type device (e.g., a server 116).

As shown in FIG. 1, the WMD system 100 may include a communication medium 118. The communication medium 114 may be a variety of communication mediums such as, but not limited to, the Internet. As shown, the WMD 102, the remote device 106, and the CCM 114, and/or the server 116 may be selectively communicatively coupled with the communication medium 118 via one or more communication links 120.

In FIG. 1, the CCM 114 may be configured to securely transmit data via the communication link 120 from the WMD 102 to the server 116. The data transmitted to the server 116 may include ECG data. The ECG data may be accessed by the doctor 108 utilizing the remote device 106. The CCM 114 may be configured to cause to display on the interface 110 communicatively coupled with the remote device 106 to facilitate analysis and/or monitoring of the patient 104 by the doctor 108 in accordance with various embodiments. Accordingly, the CCM 114 may be configured to facilitate capturing a portion of the ECG data, where the captured portion of the ECG data may be based upon a predetermined parameter such as, but not limited to, a heart rhythm event (e.g., a potential arrhythmia event). Additionally, the CCM 114 may be configured to facilitate capturing another portion of the ECG data. The CCM 114 may be configured to cause to display at least the two captured portions of the ECG data on the interface 110 concurrently, which may facilitate comparison of the two portions of the ECG data by the doctor 108. As a result, the analysis and/or monitoring of the patient by the doctor may be facilitated.

In some embodiments, the WMD system 100 may include more than one WMD 102, more than one remote device 106, more than one processor 112, more than one CMM 114, more than one server 116, and/or more than one communication medium 118.

In FIG. 1, the communication link 120 may be established selectively. For example, the WMD 102 may be communicatively coupled with the server 116 via the communication medium 118, while the remote device 106 may not be communicatively coupled to the communication medium 118. The communication link 120 may be established as desired and may not be established at all times and/or any combination of devices having communication capabilities. The communication medium may include a wide variety of communication mediums and combinations as described previously. Accordingly, the claimed subject matter is not limited in this respect.

The remote device 106 may be a wide variety of devices having communication capabilities such as, but not limited to, smart phones, tablets, laptops, surface devices, healthcare device (e.g., electrocardiogram devices utilized in medical facilitates/hospitals). Corresponding communication mediums and/or communication links may be utilized. Accordingly, in some embodiments, the CCM 114 may be hosted on these variety of devices having communication capabilities. Alternatively, and/or in combination, the CCM 114 may be hosted on the WMD 102, hosted on the server 116, hosted on the remote device 106, and/or hosted in a ubiquitous environment (e.g., the Cloud) in accordance with various embodiments.

The communication medium 118 may include a wide variety of communication mediums such as, but not limited to, the Internet, personal area networks (PAN), local area networks (LAN), wireless local area networks (WLAN), campus area networks (CAN), metropolitan area networks (MAN), wide area networks (WAN), storage-area networks (SAN), system-area networks, passive optical local area networks (POLAN), enterprise private networks (EPN), virtual private networks (VPN), and so forth. Accordingly, the claimed subject matter is not limited in this respect.

Correspondingly, the various communication methodologies may be utilized such as, but not limited to, wired communication methodologies, wireless communication technologies including wireless protocols such as, but not limited to, Wi-Fi, Bluetooth, Near-Field Communication, Radio-frequency identification (RFID), various IEEE 802 based wireless communication including Zigbee, cellular wireless communication, and so forth. Accordingly, the claimed subject matter is not limited in this respect.

Figure 2:
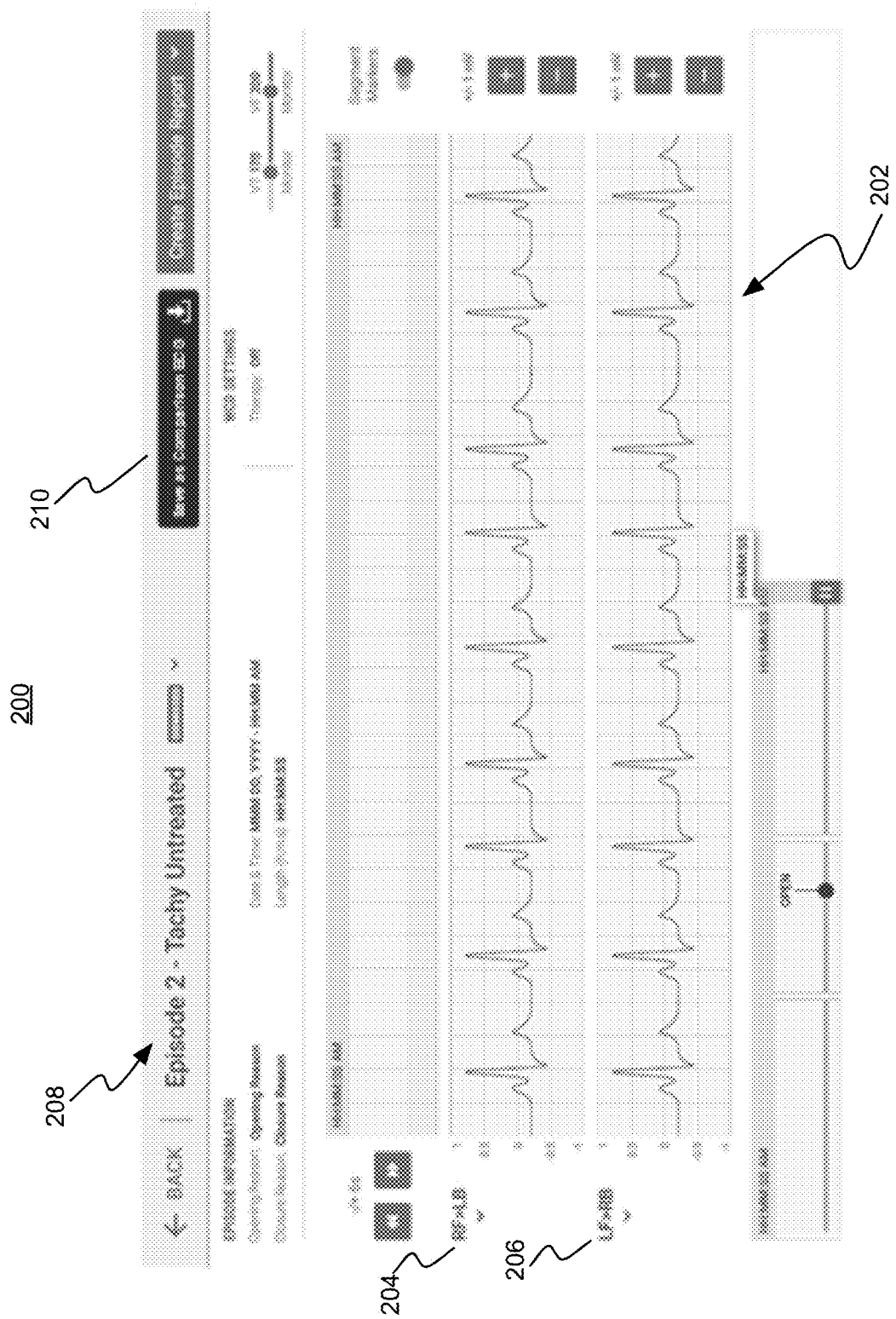
FIG. 2 illustrates an example screenshot of a user interface of a remote device in accordance with various embodiments.

FIG. 2 illustrates an example screenshot of a user interface of a remote device in accordance with various embodiments. Displayed in FIG. 2, a user interface 200 may include an example of six second portions of an ECG data of a patient (e.g., ECG data 202). The ECG data 202 may represent ECG data from two channels (i.e., vectors). Different channels or vectors may be defined for different pairs of ECG electrode placements on the body of the patient (e.g., Right Front, Right Back, Left Front, and Left Back of the patient). Accordingly, the user interface 200 may include a Right Front-Left Back channel (RF-LB 204) and a Left Front-Right Back channel (LF-RB 206).

The ECG data 202 may illustrate an ECG data captured based upon a predetermined parameter, which may be an event as described previously (i.e., a tachycardia episode 208). As shown in FIG. 2, a WMD (e.g., the WMD 102 shown in FIG. 1 and elsewhere in the disclosure), which may have been utilized to detect the tachycardia episode 208, may have determined the tachycardia episode 208 was a non-treatable event (i.e., untreated).

An interface button, which may be displayed as a "Save as Comparison ECG" button (e.g., save button 210), may be included and displayed on the user interface 200 to facilitate saving of one or more portions of the ECG data 202 in accordance with various embodiments. A remote person (e.g., the doctor 108 shown in FIG. 1) may be provided the capability to select a portion of the ECG data 202 to save as a comparison ECG data by selecting the save button 210. The remote person may be provided the capability to select a wide variety of portions and/or combination of portions of the ECG data 202. For example, the remote person may select of all of the channels as a comparison ECG, while in other examples, the ECG portion or portions of a subset of the channels may be saved as the comparison ECG.

In some examples, the user interface 200 may be configured to display two channels (RF-LB 204 and LF-RB 206) of three or more possible channels facilitating selectively saving of channels that may be utilized as a comparator portion (i.e., the remote person may select to display two of several available channels by selecting the save button 210 corresponding to the two channels (RF-LB 204 and LF-RB 206). Accordingly, the CCM 114 shown in FIG. 1 may be configured to facilitate selection of a wide variety of portions of an ECG data for comparison.

Figure 3:
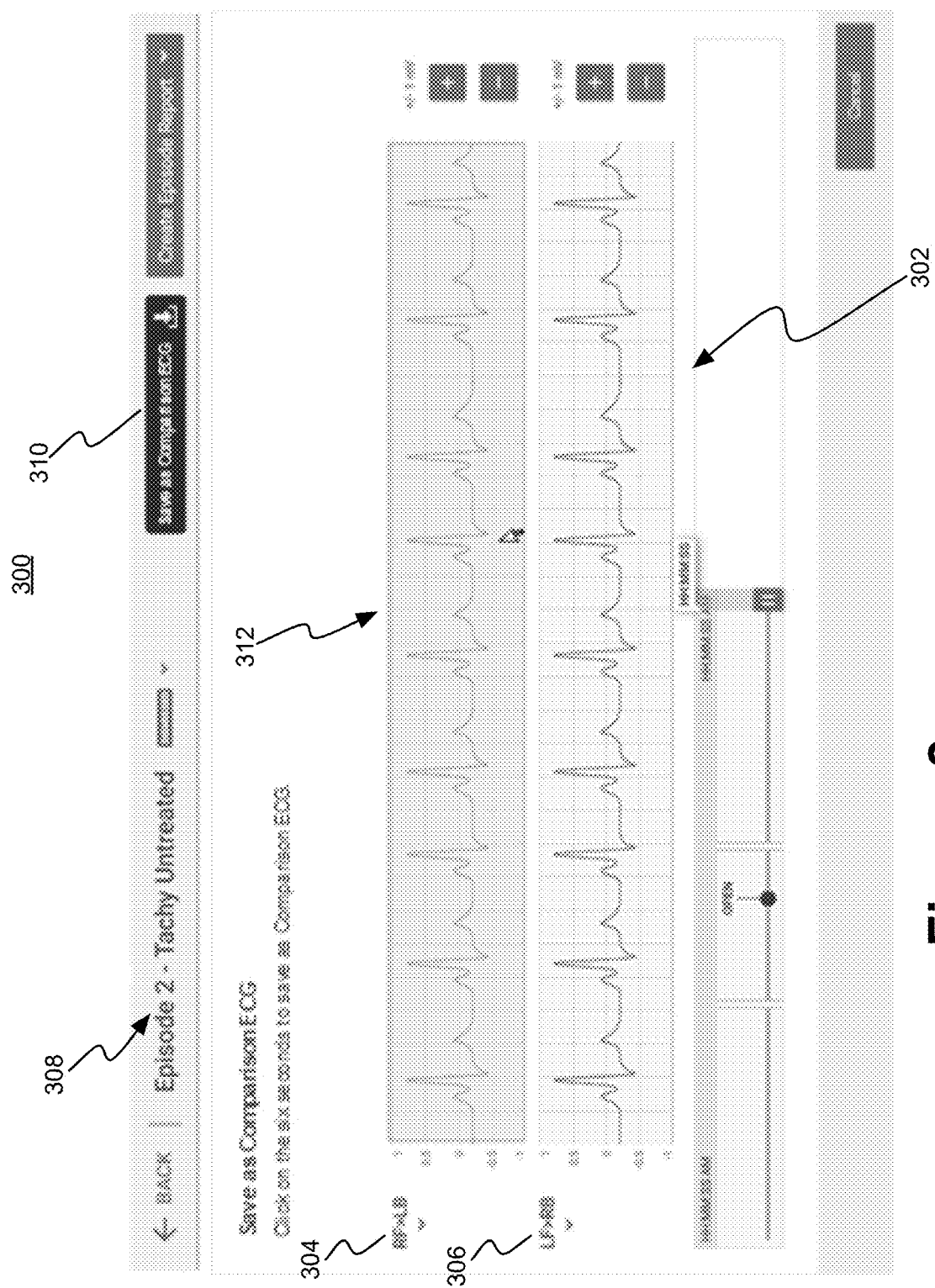
FIG. 3 illustrates an example screenshot of a user interface of a remote device in accordance with various embodiments.

FIG. 3 illustrates an example screenshot of a user interface of a remote device in accordance with various embodiments. In FIG. 3, a user interface 300 may be similar to the user interface 200 shown in FIG. 2. Similar to the user interface 200, the user interface 300 may include an ECG data 302 that may display two channels RF-LB 304 and LF-RB 306. The ECG data 302 may have been captured at a tachycardia episode 308. Included in the user interface 300 may be and a save button 310. Additionally, in the embodiment shown in FIG. 3, the remote user may have selected a portion to be saved for comparison and may be shown as a highlighted area (selected portion 312).

In the example of FIG. 3, the selected portion 312 may include a portion of the ECG data 302 from the RF-LB 304 channel.

In FIG. 3, the remote person may select the save button 310 to save the selected portion 312. As will be described, the selected portion 312 may be utilized to compare with other portions of ECG data in accordance with various embodiments.

Figure 4:
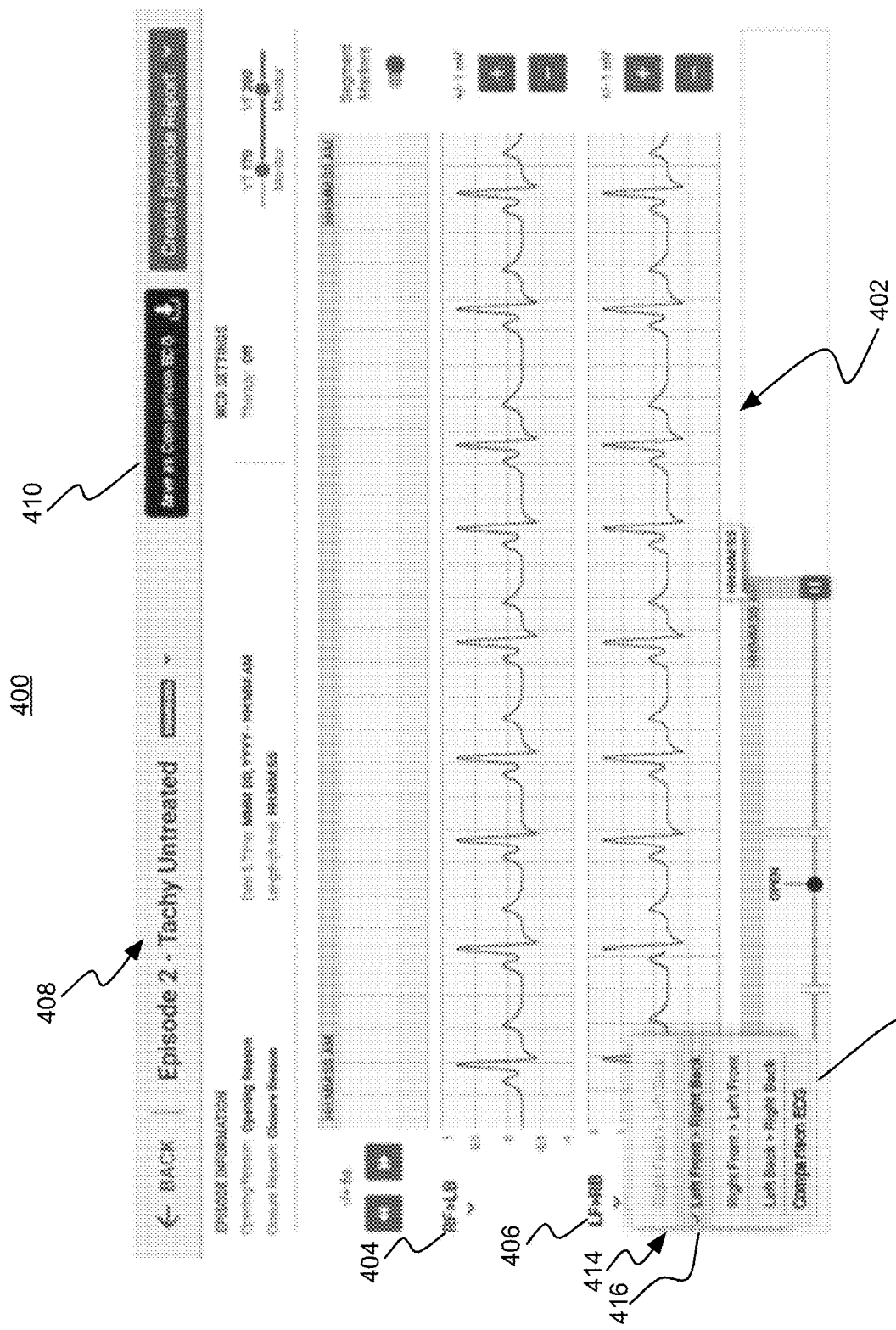
FIG. 4 illustrates an example screenshot of a user interface of a remote device in accordance with various embodiments.

FIG. 4 illustrates an example screenshot of a user interface of a remote device in accordance with various embodiments. In FIG. 4, a user interface 400 may be similar to the user interfaces 200 and 300 shown in FIGS. 2 and 3. Similar to the user interfaces 200 and 300, the user interface 400 may include an ECG data 402 that may display two channels RF-LB 404 and LF-RB 406. The ECG data 402 may have been captured at a tachycardia episode 408. Included in the user interface 400 may be and a save button 410.

In the embodiment of FIG. 4, the user interface 400 may include a selection interface 412. The selection interface 412 may facilitate selection of portions of the ECG data 402 to be compared. Additionally, the selection interface 412 may include one or more selectable channels 414 on the user interface 400 that may be utilized for the comparison. In the one example shown in FIG. 4, the remote person may have selected the "Left Front-Right Back" channel 416 to be utilized to display the comparisons of the portions (captured and/or saved portions) of the ECG data 402. As a result, analysis and/or monitoring of the patient by the doctor may be facilitated by utilizing a configurable comparator for portions of ECG data in accordance with various embodiments.

Figure 5:
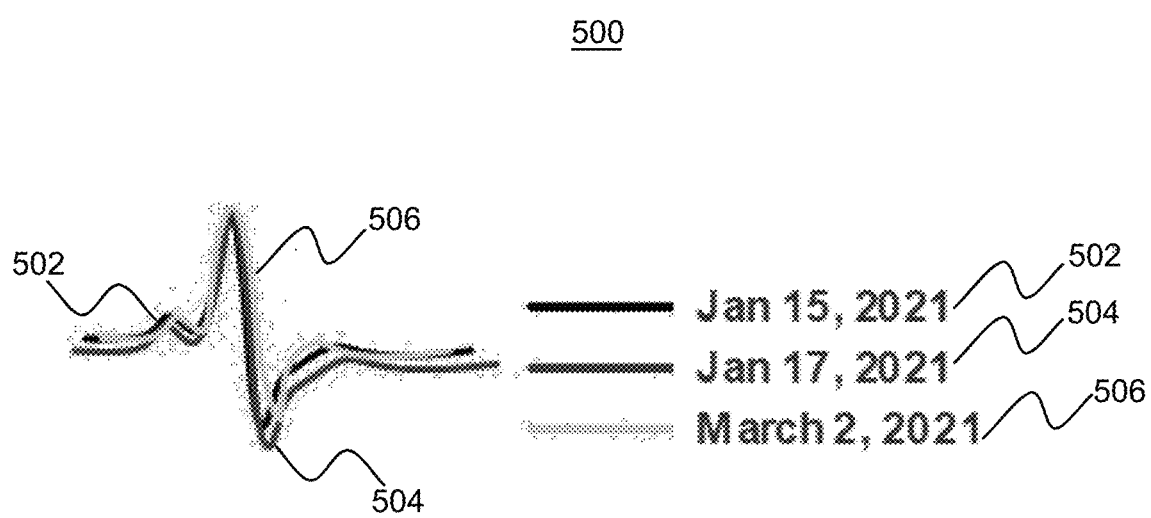
FIG. 5 illustrates comparing portions of ECG data in accordance with various embodiments.

FIG. 5 illustrates comparing portions of ECG data in accordance with various embodiments. In FIG. 5, comparison ECG data 500 may include a first portion 502, a second portion 504, and a third portion 506 of ECG data. As shown in FIG. 5, the first portion 502 may represent a portion of ECG data that may have been captured on a particular date (e.g., Jan. 15, 2021), the second portion 504 may represent a portion of ECG data that may have been captured on another particular date (e.g., Jan. 17, 2021), and the third portion 506 may represent a portion of ECG data that may have been captured on yet another particular date (e.g., Mar. 2, 2021). The comparison ECG data 500 may show the first portion 502, the second portion 504, and the third portion 506 superimposed upon one another. Accordingly, the comparison ECG data 500 may facilitate determination of improving or worsening cardiac condition and/or determine various heart related conditions. As a result, analysis and/or monitoring of the patient by the doctor may be facilitated by utilizing a configurable comparator for portions of ECG data in accordance with various embodiments.

In should be appreciated that the example user interfaces of FIGS. 2-5 are only examples of user interfaces and may be configured in a variety of manners. For example, in addition to and/or alternatively, user interfaces of FIGS. 2-5 may include selectable buttons, dropdown menus, fillable areas, and so forth. Accordingly, the claimed subject matter is not limited in this respect.

Figure 6:
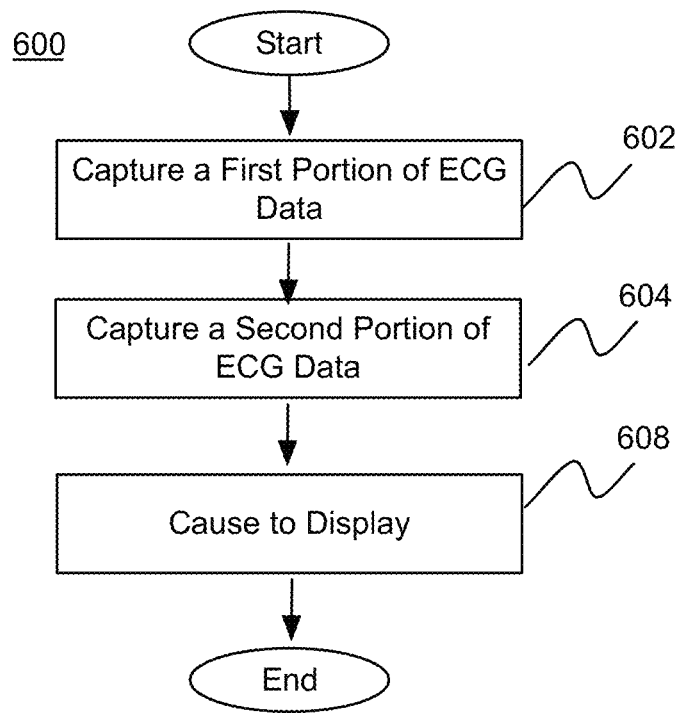
FIG. 6 illustrates an operational flow for configurable comparator of ECG information regarding a patient utilizing a WMD in accordance with various embodiments as described herein.

FIG. 6 illustrates an operational flow for configurable comparator of ECG information regarding a patient utilizing a WMD in accordance with various embodiments as described herein. In some portions of the description, illustrative implementations of the method are described with reference to the elements depicted in FIGS. 1-5. However, the described embodiments are not limited to these depictions.

Additionally, FIG. 6 employs block diagrams to illustrate the example methods detailed therein. These block diagrams may set out various functional block or actions that may be described as processing steps, functional operations, events and/or acts, etc., and may be performed by hardware, software, and/or firmware. Numerous alternatives to the functional blocks detailed may be practiced in various implementations. For example, intervening actions not shown in the figures and/or additional actions not shown in the figures may be employed and/or some of the actions shown in one figure may be operated using techniques discussed with respect to another figure. Additionally, in some examples, the actions shown in these figures may be operated using parallel processing techniques. The above described, and other not described, rearrangements, substitutions, changes, modifications, etc., may be made without departing from the scope of the claimed subject matter.

In some examples, operational flow 600 may be employed as part of WMD system having communication capabilities. Beginning at block 602 ("Capture a First Portion of ECG Data"), a wearable device system may include a WMD, a remote device, a server, and a CCM, where the CCM may be configured to capture a first portion of an ECG data. The data may be based on a predetermined parameter. The first portion may be indicative of a non-episode portion of the ECG data.

Continuing from block 602 to block 604 ("Capture a Second Portion of ECG Data"), the CCM may be configured to capture a second portion of ECG data. The second portion may be indicative of an episode portion of the ECG data.

Continuing from block 604 to block 606 ("Cause to Display"), the CCM may be configured to display the first portion and the second portion concurrently for comparison by a user for use in a medical diagnosis.

In general, the operational flow described with respect to FIG. 6 and elsewhere herein may be implemented as a computer program product, executable on any suitable computing system, or the like. For example, a computer program product for managing communication of information regarding a medical device may be provided. Example computer program products may be described with respect to FIG. 7 and elsewhere herein.

FIG. 7 illustrates an example computer program product 700, arranged in accordance with at least some embodiments described herein. Computer program product 700 may include machine readable non-transitory medium having stored therein instructions that, when executed, cause the machine to facilitate configurable comparison of ECG data according to the processes and methods discussed herein. Computer program product 700 may include a signal bearing medium 702. Signal bearing medium 702 may include one or more machine-readable instructions 704 which, when executed by one or more processors, may operatively enable a computing device to provide the functionality described herein. In various examples, the devices discussed herein may use some or all of the machine-readable instructions.

In some examples, the machine readable instructions 704 may include a configurable comparator module (CCM) configured to capture a first portion of an ECG data based on a predetermined parameter, where the first portion may be indicative of a non-episode portion of the ECG data. In some examples, the machine readable medium 704 may facilitate the CCM to capture a second portion of the ECG data, where the second portion may be indicative of an episode portion of the ECG data. In some examples, the machine readable medium 704 may facilitate the CCM to cause to display the first portion and the second portion concurrently for comparison by a user in a medical diagnosis.

In some implementations, signal bearing medium 702 may encompass a computer-readable medium 706, such as, but not limited to, a hard disk drive, a Compact Disc (CD), a Digital Versatile Disk (DVD), a Universal Serial Bus (USB) drive, a digital tape, memory, etc. In some implementations, the signal bearing medium 702 may encompass a recordable medium 708, such as, but not limited to, memory, read/write (R/W) CDs, R/W DVDs, etc. In some implementations, the signal bearing medium 702 may encompass a communications medium 710, such as, but not limited to, a digital and/or an analog communication medium (e.g., a fiber optic cable, a waveguide, a wired communication link, a wireless communication link, etc.). In some examples, the signal bearing medium 702 may encompass a machine readable non-transitory medium.

In general, the methods described with respect to FIG. 6 and elsewhere herein may be implemented in any suitable computing system. Example systems may be described with respect to FIG. 12 and elsewhere herein. In general, the system may be configured to facilitate a configurable comparator module in accordance with various embodiments.

Figure 8:
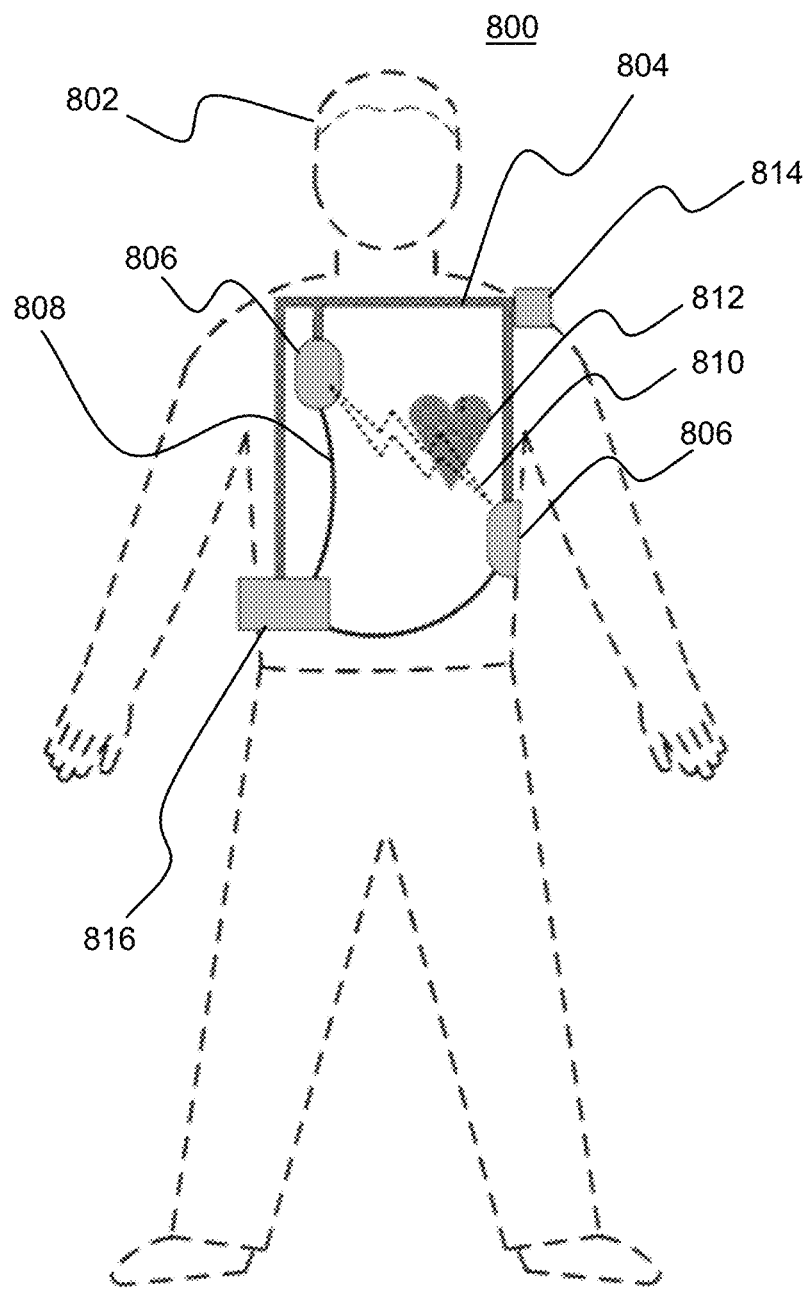
FIG. 8 illustrates a wearable medical device (WMD) in accordance with various embodiments.

FIG. 8 illustrates a wearable medical device (WMD) in accordance with various embodiments. In FIG. 8, a WMD 800 may be configured by a person 802. The person 802 may also be referred to a patient and/or wearer since the person 802 may be wearing various components of the WMD 800. The person 802 may be ambulatory, which means that, while wearing the wearable portion of the WMD 800, the person 802 may walk around and may not necessarily be bed ridden. While the person 802 may be considered to be also a "user" of the WMD 800, this is not a requirement. For example, a user of the WMD 800 may also be a clinician such as, but not limited to, a doctor, nurse, emergency medical technician (EMT) and/or other similarly tasked individual or group of individuals. In some examples, a user may even be a bystander. The particular context of these and other related terms within this description should be interpreted accordingly.

Shown in FIG. 8, the WMD 800 may include a support structure 804 that may be wearable by the person 802. Accordingly, the support structure 804 may be configured to be worn by the person 802 for at least several hours per day, for at least several days, and/or for a few months. It should be understood that the support structure 804 is shown generically in FIG. 8 and may be partially conceptual. Accordingly, the WMD 800 may be shown to provide merely illustrative concepts about the support structure 804 and is not to be construed as limiting as to the manner of the implementation of the support structure 804 is implemented or the manner of how the support structure 804 may be worn.

It should be appreciated that the support structure 804 may be implemented in a wide variety of manners. For example, the support structure 804 may be implemented as a single component or a combination of multiple components. In some examples, the support structure 804 may include a vest, a half-vest, a garment, and so forth. In such examples, the support structure 804 may be worn similarly to analogous articles of clothing. In some examples, the support structure 804 may include a harness, one or more belts, and/or straps, and so forth. In such examples, the support structure 804 may be configured to be worn by the person 802 around the torso, hips, over the shoulder, and so forth. In some examples, the support structure 804 may include a container or housing, which may be water resistant/proof. In such examples, the support structure 804 may be configured to be worn by being attached to the body of the person 802 by adhesive material as shown in some examples described in U.S. Pat. No. 8,024,037. The support structure 804 may be implemented as some examples described for support structures of US Pat. App. No. US2017/0056682, which is incorporated herein by reference. As may be appreciated, the person skilled in the relevant art will recognize that additional components of the WMD 600 may be included in a housing of the support structure 804 instead of being attached externally to the support structure as may be described in the US2017/0056682 document.

In FIG. 8, the WMD 800 may be described an external defibrillator (e.g., wearable cardioverter defibrillator or WCD), which may include a housing and an energy storage module within the housing. As such, in the context of a WCD, the WMD 800 may be also known as a main electronics module. The energy storage module may be configured to store an electrical charge. Other components can cause at least some of the stored electrical charge to be discharged via electrodes through the person 602 to facilitate delivery of one or more defibrillation shocks through the person 802. Additional details of the WMD 800 may be described in additional sections of the present disclosure.

Turning now to some of the details in FIG. 8, the WMD 800 may include defibrillation electrodes 806, which may be electrically coupled to the WMD 800 via electrode leads 808. The defibrillation electrodes 806 may be configured to be worn by the person 804 in a variety of manners. For example, the WMD 800 and the defibrillation electrodes 806 may be electrically coupled to the support structure 804 either directly or indirectly. That is, the support structure 804 may be configured to be worn by the person 802 while maintaining at least one of defibrillation electrodes 806 may be in contact on the body of person 802. The contact on the body of the person 802 may be maintained, while the person 802 may be moving around. Accordingly, at least one of the defibrillation electrodes 806 may be maintained on the body of the person 802 by being attached to the skin of person 802 (e.g., pressed against the skin directly or through garments). In some examples, the defibrillation electrodes 806 may not be pressed against the skin of the person 802 (i.e., not in direct contact), but may be or become biased as if pressed against the skin of the person 802 to facilitate sensing a condition that may merit intervention by the WMD 800. Additionally, various components of WMD 800 may be considered included/coupled to support structure 804 directly and/or indirectly via at least one of defibrillation electrodes 806.

In FIG. 8, when the defibrillation electrodes 806 make good electrical contact with the body of the person 802, the WCD 800 may be capable of administering, via the defibrillation electrodes 806, a brief, strong electric pulse 810 through the body of the person 802. The electric pulse 810, which may be also known as a shock, a defibrillation shock, a therapy, an electrotherapy, a therapy shock, and so forth. The electric pulse 810 may be intended to go through and restart the heart 812 of the person 802, which may be an effort to save the life of person 802. The electric pulse 810 may include one or more pacing pulses of lesser electrical magnitude to facilitate pacing of the heart 812 as needed.

In some examples, the WMD 800 may initiate defibrillation, or hold-off defibrillation, based on a variety of inputs, where an electrocardiogram (ECG) signal may be included as one or more variety of inputs.

The WMD 800 shown in FIG. 8, may be configured to obtain data from the person 802. In one example, the WMD 800 may include at least an outside monitoring device 814, which may be configured to facilitate the obtaining of the data (i.e., collecting the data). The outside monitoring device 814 may be referred to as an "outside" device because it could be provided as a standalone device (i.e., not included within the housing of a WMD monitor 816. The WMD monitor 816 may include various components to facilitate the functionality of the WMD 800 (e.g., defibrillator). Some of the various components may be described with respect to FIG. 12.

The outside monitoring device 814 may be configured to sense or monitor at least one local parameter. A local parameter may be a parameter of the person 802, a parameter of the WMD 800, and/or or a parameter of the environment, as may be described in other sections of the present disclosure. For some of these parameters, outside monitoring device 814 may include one or more sensors or transducers to facilitate sensing or monitoring at least one local parameter. Each one of such sensors may be configured to sense a parameter of the person 802 and to provide an input responsive to the sensed or monitored parameter. In some examples, the input may be quantitative such as, but not limited to values of a sensed parameter. In some examples, the input may be qualitative such as, but not limited to, informing whether or not a threshold is crossed. Sometimes these inputs about person 802 may also be referred to as physiological inputs and/or patient inputs. As may be appreciated, a sensor can be construed more broadly as encompassing many individual sensors.

Optionally, outside monitoring device 814 may be physically coupled to the support structure 804. Additionally, outside monitoring device 814 may be communicatively coupled with other components that may be coupled to the support structure 804. Such communication may be implemented by a communication module, as will be deemed applicable by a person skilled in the relevant art in view of the present disclosure.

In some examples, one or more of the components of the WMD 800 may be customized for the person 802. The customization may include a number of aspects. In one example, the support structure 804 may be tailored to the body of the person 802. In another example, a baseline physiological parameters of the person 802 may be measured such as, but not limited to, the heart rate of the person 802 while resting, while walking, motion detector outputs while walking, and so forth. The measured values of such baseline physiological parameters may be utilized to facilitate customization of the WMD 800, which may facilitate a more accurate diagnoses for bodies that may differ from one person to another. The physiological parameter values may be stored in a storage medium of the WMD 800. Additionally, a programming interface may be included according to some embodiments, which may be configured to receive such measured values of physiological parameters. The programming interface may be configured to acquire and/or input and/or store in the WMD 800 variety of data including the physiological parameters.

Figure 9:
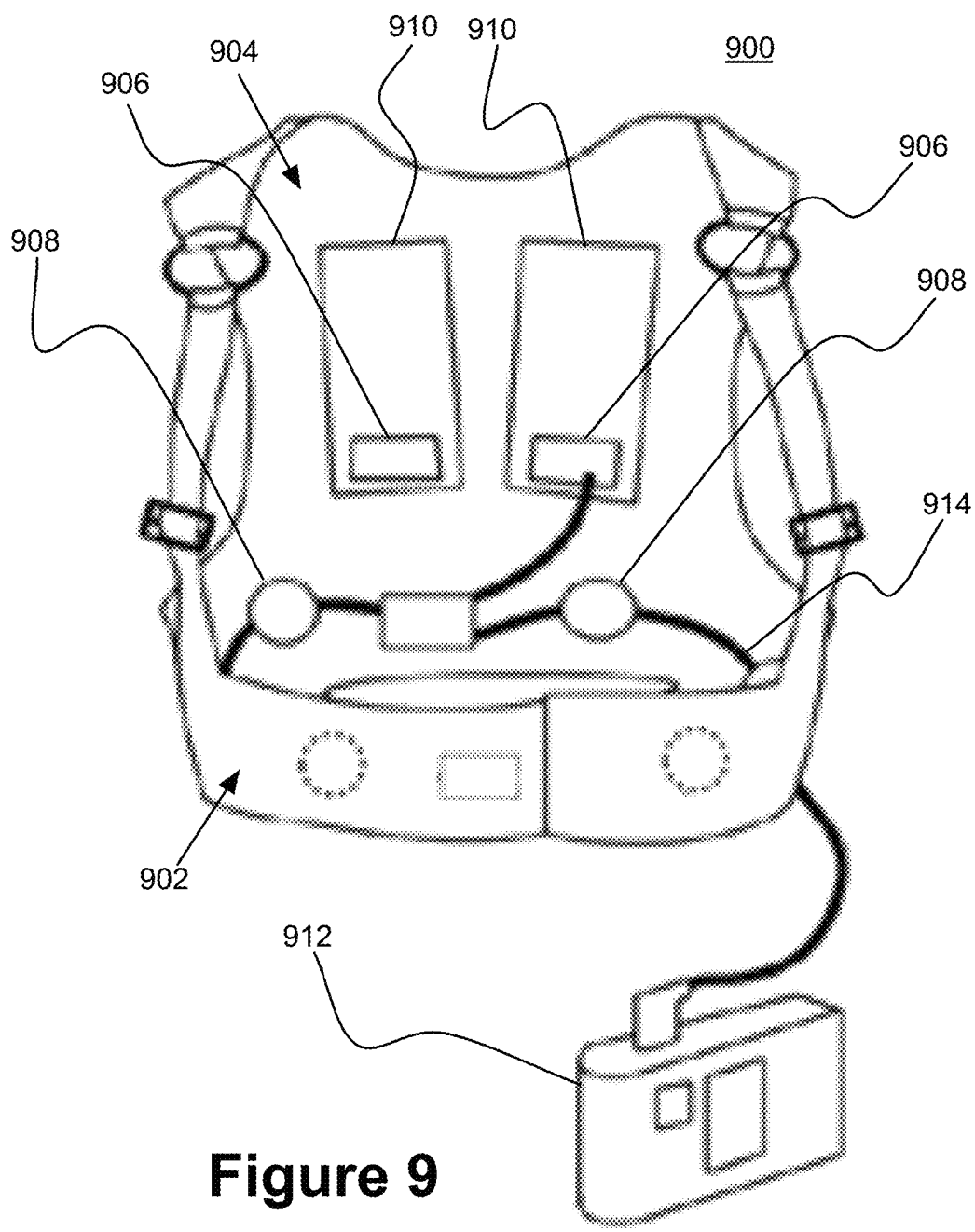
FIG. 9 illustrates a wearable medical device (WMD), in accordance with various embodiments.

FIG. 9 illustrates a wearable medical device (WMD), in accordance with various embodiments. In FIG. 9, a WMD may be configured to facilitate monitoring and treatment of a person's heart such as, but not limited to, a wearable cardioverter defibrillator (WCD) 900. The WCD 900 may be in the form of a clothing configured to be worn by a user such as, but not limited to, a vest type. Accordingly, the WCD 900 may have a front side 902 and a back side 904 forming the vest type WCD 900 as shown. Additionally, the WCD 900 may include one or more electrodes configured to defibrillate the person's heart, defibrillator electrodes (therapy electrodes 906) and one or more electrodes configured to detect and measure the person's electrocardiogram (ECG), monitor electrodes 908.

The WCD 900 may be configured to be worn by the person to facilitate maintenance of the therapy electrodes 906 and the monitor electrodes 908 on the body of the person. For example, therapy electrodes 906 may be included in pockets 910. In one example, the inside of pockets 910 may be made of loose netting to facilitate contact of the therapy electrodes 906 on the back of the person and may include assistance of conductive fluid that may have been deployed for the therapy electrodes 906. Additionally, the monitor electrodes 908 may be maintained in positions that may surround the torso of the person torso, which may facilitate sensing ECG signals and/or the impedance of the person.

In some examples, the ECG signals may include too much electrical noise to be useful. In order to address the electrical noise, multiple monitor electrodes 908 may be utilized to sense the ECG signals and may be processed. These options are different vectors for sensing the ECG signal, as described now in more detail.

It should be appreciated after review of this disclosure that the locations of the therapy electrodes 906 may be shown in various configurations such as, but not limited to, one front and one back, across a chest, across a back, etc. to facilitate defibrillation, and accordingly, the locations of the therapy electrodes 906 and/or the monitor electrodes 908 in FIG. 9 may be for illustrative purposes to show that there may be some electrodes to facilitate operation of the WCD 900. Additionally, for the purposes of the detailed description, references may be made to "an electrode", which may be any one of electrodes (therapy electrodes 906 and/or monitor electrodes 908) to provide the functionality of the WCD 900.

Continuing to refer FIG. 9, the WCD 900 may include a WCD monitor 912. In the example shown in FIG. 9, the WCD monitor 912 may be communicatively coupled to the therapy electrodes 906 and/or monitor electrodes 908 via one or more wires 914. However, in some other examples, the WCD monitor 912 may be integrated with the WCD such as, but not limited to, the back side 904. The WCD monitor 912 may include various components to facilitate the functionality of the WCD 900 (i.e., monitor and defibrillate the person's heart) such as, but not limited to, a processor, memory, power supply (e.g., battery), a display, and so forth. Some of these components may be described in further detail later in the disclosure.

It should be appreciated that the example WCD 900 shown in FIG. 9 may be in the form of a vest. However, the WCD 900 may be in the form of a wide variety of clothing such as, but not limited to, a jacket, a t-shirt, a dress shirt, a belt, a blouse, a coat, and any combination thereof. Accordingly, the components of the WCD 900 may be integrated with a wide variety of wearable clothing.

Figure 10:
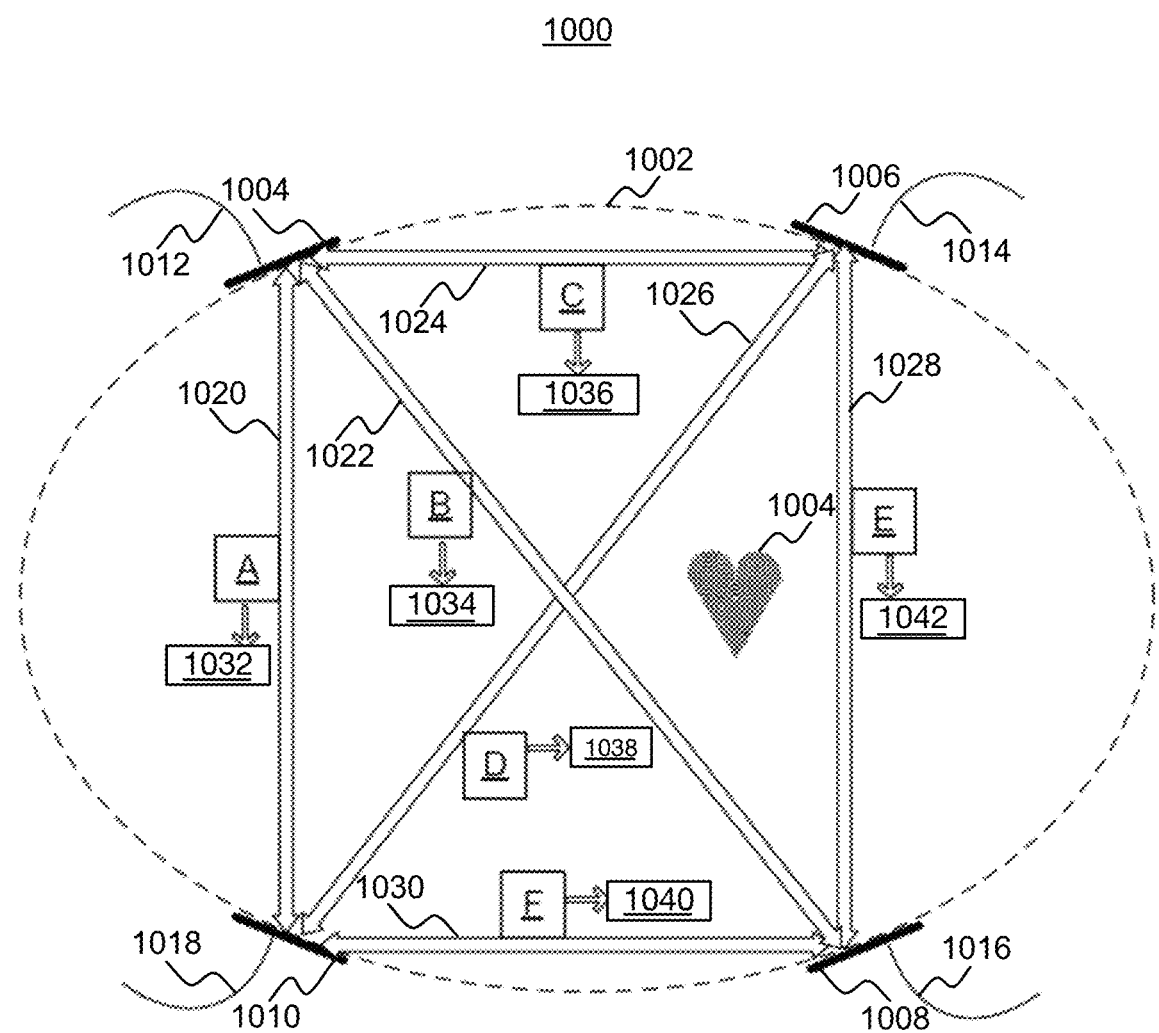
FIG. 10 illustrates a conceptual diagram for illustrating utilization of multiple electrodes of a WCD system that may be used for sensing ECG signals along different vectors according to various embodiments.

FIG. 10 illustrates a conceptual diagram for illustrating utilization of multiple electrodes of a WCD system that may be used for sensing ECG signals along different vectors according to various embodiments. In FIG. 10, the sizes/shapes/positions of the torso, electrodes, and heart may be approximations and not to scale. In FIG. 10, a WCD system 1000 may include a section of a person 1002 having a heart 1004 may be shown. In FIG. 10, the person 1002 may be viewed from the top, the person 1002 may be facing downwards, and the plane of FIG. 10 may intersect the person 1002 at the torso of the person 1002.

Shown in FIG. 10, four ECG sensing electrodes 1004, 1006, 1008, and 1010 may be maintained on the torso of person 1002 and may include wire leads 1012, 1014, 1016, and 1018 respectively. In FIG. 10, the four ECG sensing electrodes 1004, 1006, 1008, and 1010 may be located to substantially surround the torso of the person 1002 similar to the monitor electrodes 1008 shown in FIG. 7.

Any pair of the four ECG sensing electrodes 1004, 1006, 1008, and 1010 may define a vector, along which an ECG signal may be sensed and/or measured. Accordingly, the four ECG sensing electrodes 1004, 1006, 1008, and 1010 may define six vectors 1020, 1022, 1024, 1026, 1028, and 1030. Accordingly, FIG. 10 may illustrate a multi-vector embodiment.

In FIG. 10, the vectors 1020, 1022, 1024, 1026, 1028, and 1030 may define channels A, B, C, D, E, and F, respectively. The channels A, B, C, D, E, and F may be utilized to sense and/or measure ECG signals 1032, 1034, 1036, 1038, 1040, and 1042 from channels A, B, C, D, E, and F, respectively. Each of the channels A, B, C, D, E, and F may include pairings of the wire leads 1012, 1014, 1016, and 1018.

Shown in FIG. 10, the ECG sensing electrodes 1004, 1006, 1008, and 1010 may be illustrated as being on the same plane for simplicity and ease of understanding but may not be on the same place. Accordingly, the vectors 1020, 1022, 1024, 1026, 1028, and 1030 may not be on the same plane.

In some examples, in order to make the shock/no-shock determination, a WCD may determine which of ECG signals 1032, 1034, 1036, 1038, 1040, and 1042 may be best for rhythm analysis and interpretation. For example, ECG signals that have the most noise may be ignored, discarded, and/or not considered, while leaving the remaining ECG signals as candidates for making the shock/no shock determination.

In some examples, the vectors 1020, 1022, 1024, 1026, 1028, and 1030 may be aggregated to make a shock/no shock decision, and/or to determine the heart rate and/or QRS complex widths of the person 1002. Some examples aggregation may be implemented as disclosed in U.S. Pat. No. 9,757,581 issued Sep. 12, 2017, entitled "WEARABLE CARDIOVERTER DEFIBRILLATOR COMPONENTS MAKING AGGREGATE SHOCK/NO SHOCK DETERMINATION FROM TWO OR MORE ECG SIGNALS", which is incorporated herein by reference.

Because a WCD may be worn by an ambulatory person (i.e., ambulatory patients), movement by the person may cause changes at the electrode-skin interface, which may introduce noise in an ECG signal. The noise introduced in the ECG signal may negatively affect the processing and interpretation of the ECG signal.

In some examples, the WCD 1000 device may utilize the four ECG sensing electrodes 1004, 1006, 1008, and 1010, which may generate six differential ECG vectors 1020, 1022, 1024, 1026, 1028, and 1030. When the person 1002 wearing the WCD 1000 may be moving, some of the ECG sensing electrodes 1004, 1006, 1008, and 1010 may move more than others which may cause some of the ECG vectors 1020, 1022, 1024, 1026, 1028, and 1030 having more noise than other ECG vectors. In some examples, different assessment methods may be utilized on the ECG vectors 1020, 1022, 1024, 1026, 1028, and 1030. If the assessments for one of the ECG vectors 1020, 1022, 1024, 1026, 1028, and 1030 have similar results, the one ECG vector may be determined to be reliable. The ECG vectors determined to be reliable may be utilized in a rhythm analysis, which may increase accuracy.

In some examples, a single ECG vector may be utilized, where different assessment methods can be used. For example, an assessment method may include utilizing the single ECG vector, where portions of the ECG signal, which may have been determined to be reliable, may be utilized in the rhythm analysis. In another example, the WCD 1000 may be configured to prompt the person 1002 to reduce activity if the number of ECG portions that may be determined to be unreliable exceeds a predetermined threshold, which may cause a reduction on the amount of noise that may be generated by the movement of the person and may increase the number of ECG portions that may be determined to be reliable.

Figure 11:
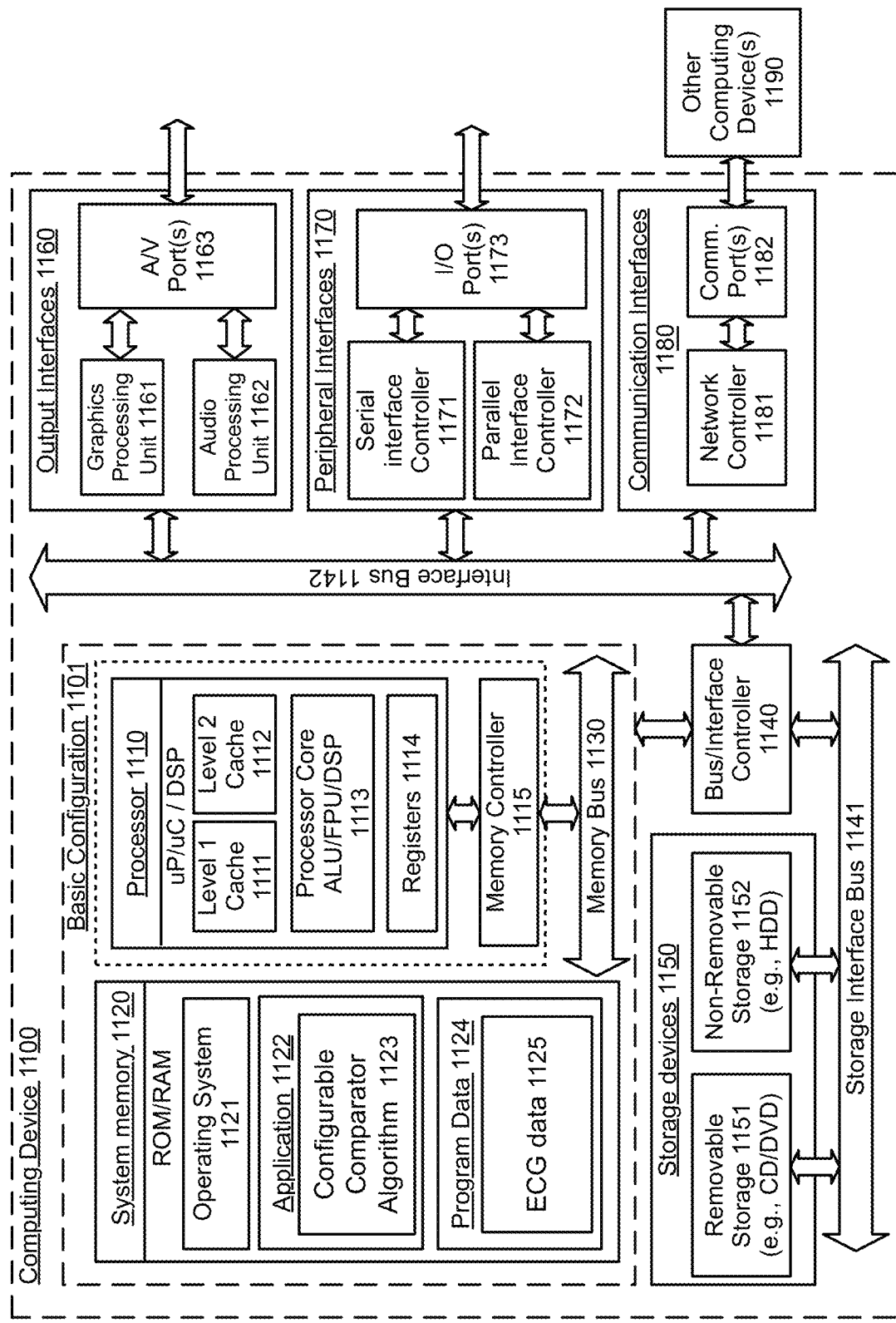
FIG. 11 is a block diagram illustrating an example computing device, such as might be embodied by a person

FIG. 11 is a block diagram illustrating an example computing device 1100, such as might be embodied by a person skilled in the art, which is arranged in accordance with at least some embodiments of the present disclosure. In one example configuration, computing device 1100 may include one or more processors 1110 and system memory 1120. A memory bus 1130 may be used for communicating between the processor 1110 and the system memory 1120.

Depending on the desired configuration, processor 1110 may be of any type including but not limited to a microprocessor ($\mu$P), a microcontroller ($\mu$C), a digital signal processor (DSP), or any combination thereof. Processor 1110 may include one or more levels of caching, such as a level one cache 1111 and a level two cache 1112, a processor core 1113, and registers 1114. The processor core 1113 may include an arithmetic logic unit (ALU), a floating point unit (FPU), a digital signal processing core (DSP Core), or any combination thereof. A memory controller 1115 may also be used with the processor 1110, or in some implementations the memory controller 1115 may be an internal part of the processor 1110.

Depending on the desired configuration, the system memory 1120 may be of any type including but not limited to volatile memory (such as RAM), non-volatile memory (such as ROM, flash memory, etc.) or any combination thereof. System memory 1120 may include an operating system 1121, one or more applications 1122, and program data 1124. Application 1122 may include configurable comparator algorithm 1123 that is arranged to perform the functions as described herein including the functional blocks and/or actions described. Program Data 1124 may include, among other information described, ECG data 1125 (e.g., portions of ECG data that may have been captured and/or saved) for use with the configurable comparator algorithm 1123. In some example embodiments, application 1122 may be arranged to operate with program data 1124 on an operating system 1121 such that implementations of configurable comparator module (CCM) having capture and comparison capabilities may be provided as described herein. For example, apparatus described in the present disclosure may comprise all or a portion of computing device 1100 and be capable of performing all or a portion of application 1122 such that facilitating configuration and comparison of portions of ECG data as described herein. This described basic configuration is illustrated in FIG. 11 by those components within dashed line 1101.

Computing device 1100 may have additional features or functionality, and additional interfaces to facilitate communications between the basic configuration 1101 and any required devices and interfaces. For example, a bus/interface controller 1140 may be used to facilitate communications between the basic configuration 1101 and one or more data storage devices 1150 via a storage interface bus 1141. The data storage devices 1150 may be removable storage devices 1151, non-removable storage devices 1152, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 1120, removable storage 1151 and non-removable storage 1152 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 1100. Any such computer storage media may be part of device 1100.

Computing device 1100 may also include an interface bus 1142 for facilitating communication from various interface devices (e.g., output interfaces, peripheral interfaces, and communication interfaces) to the basic configuration 1101 via the bus/interface controller 1140. Example output interfaces 1160 may include a graphics processing unit 1161 and an audio processing unit 1162, which may be configured to communicate to various external devices such as a display or speakers via one or more A/V ports 1163. Example peripheral interfaces 1160 may include a serial interface controller 1171 or a parallel interface controller 1172, which may be configured to communicate with external devices such as input devices (e.g., keyboard, mouse, pen, voice input device, touch input device, etc.) or other peripheral devices (e.g., printer, scanner, etc.) via one or more I/O ports 1173. An example communication interface 1180 includes a network controller 1181, which may be arranged to facilitate communications with one or more other computing devices 1190 over a network communication via one or more communication ports 1182. A communication connection is one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), infrared (IR) and other wireless media. The term computer readable media as used herein may include both storage media and communication media.

Computing device 1100 may be implemented as a portion of a small-form factor portable (or mobile) electronic device such as a cell phone, a personal data assistant (PDA), a personal media player device, a wireless web-watch device, a personal headset device, an application specific device, or a hybrid device that includes any of the above functions. Computing device 1100 may also be implemented as a personal computer including both laptop computer and non-laptop computer configurations. In addition, computing device 1100 may be implemented as part of a wireless base station or other wireless system or device.

Figure 12:
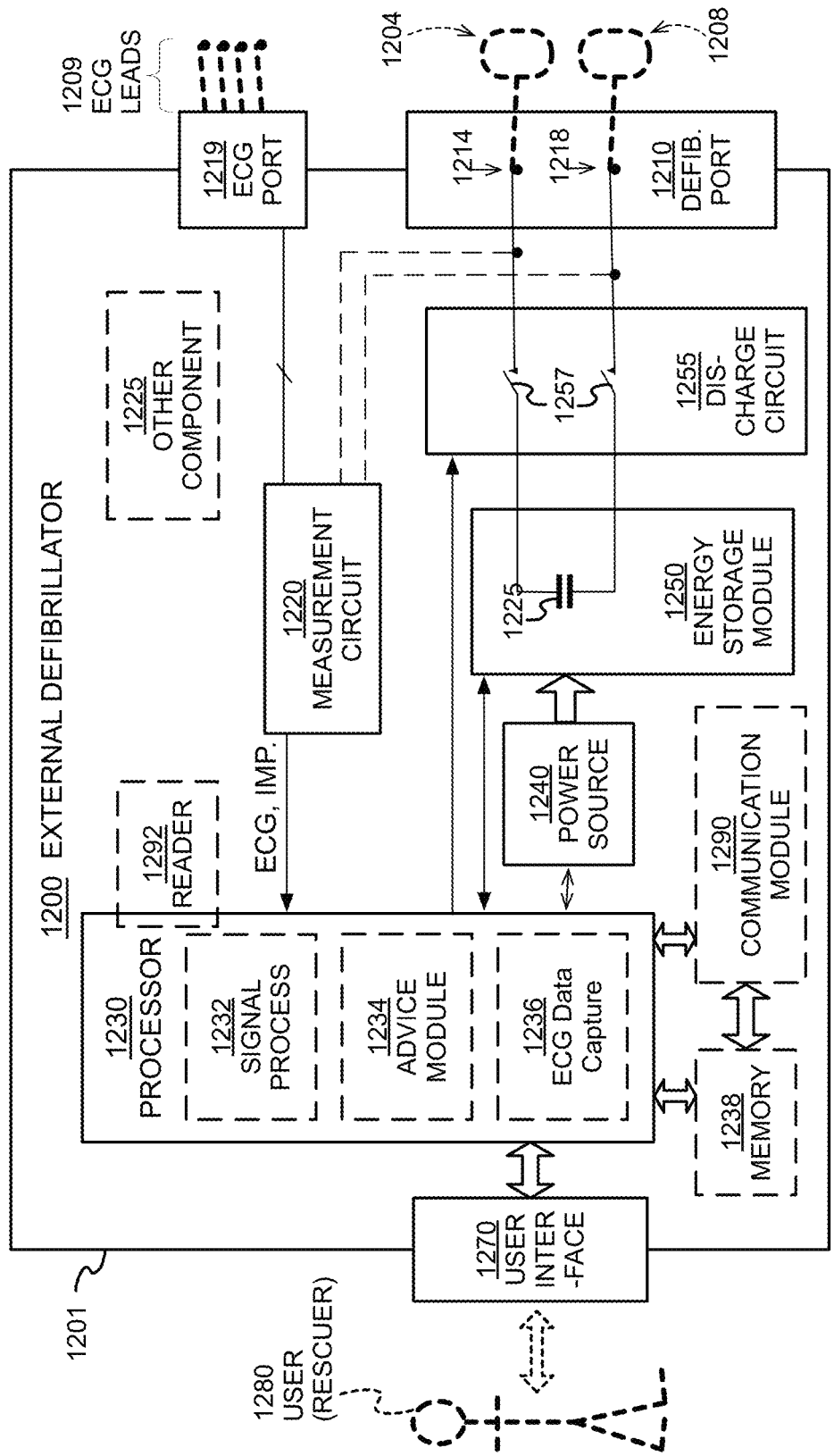
FIG. 12 is a block diagram illustrating components of a medical device, which may be used with various embodiments.

FIG. 12 is a block diagram illustrating components of a medical device (e.g., External Defibrillator 1200), which may be used with various embodiments. These components may be, for example, a medical device 102, 800, 900, and 1000 (shown in FIGS. 1, 8, 9, and 10). For simplicity, the medical device may be an example of a defibrillator device.

The defibrillator device 1200 may be intended for use by a user 1280 (e.g., the person 104 and 802 shown in FIGS. 1 and 8). The defibrillator device 1200 may typically include a defibrillation port 1210, such as a socket in housing 1201. The defibrillation port 1210 may include nodes 1214 and 1218. One or more electrodes 1204 and 1208 may be plugged in to the defibrillation port 1210, so as to make electrical contact with nodes 1214 and 1218, respectively. It may also be possible that the electrodes 1204 and 1208 may be connected continuously to the defibrillation port 1210, etc. Either way, the defibrillation port 1210 may be used for guiding via the electrodes 1204 and 1208 to the person 1280 an electrical charge that may have been stored in the defibrillator device 1200, as described herein.

If the defibrillator device 1200 comprise of a heart monitoring component, as was described herein, the defibrillator device 1200 may also have an ECG port 1219 in the housing 1201, for receiving ECG leads 1209. The ECG leads 1209 may facilitate sensing of an ECG signal (e.g., a 12-lead signal or from a different number of lead signals), and electrode attachment integrity may be determined from the ECG signal, in accordance with the various embodiments disclosed herein. Moreover, a heart monitoring component could have additional ports (not shown), and the other component 1225 may be configured to utilize the electrical signal (e.g., ECG signal, impedance, etc. to facilitate determination of electrode leads off from the skin of the user 1280), in accordance with various embodiments.

The defibrillator 1200 also may include a measurement circuit 1220. The measurement circuit 1220 may receive physiological signals from the ECG port 1219, and also from other ports, if provided (e.g., previously described lead-off circuitry). The circuit 1220 may render detected physiological signals and their corresponding information. The information may be in the form of data, or other signals, etc.

The measurement circuit 1220 may obtain physiological signals through the nodes 1214 and 1218 instead, when the electrodes 1204 and 1208 are attached to the person 1280 (i.e., the skin). In these cases, a person's ECG signal may be detected as a voltage difference between the electrodes 1204 and 1208. Additionally, the impedance between the electrodes 1204 and 1208 may detect, among other things, whether the electrodes 1204 and 1208 have been inadvertently disconnected from the skin of the person 1280.

The defibrillator 1200 may also include a processor 1230. The processor 1230 may be implemented in a wide variety of manners for causing actions and operations to be performed. Some examples may include digital and/or analog processors such as microprocessors and digital-signal processors (DSPs), controllers such as microcontrollers, software running in a machine environment, programmable circuits such as Field Programmable Gate Arrays (FPGAs), Field-Programmable Analog Arrays (FPAAs), Programmable Logic Devices (PLDs), Application Specific Integrated Circuits (ASICs), and so on or any combination thereof.

The processor 1230 may include a number of modules. One example module may be a signal processing module 1232, which may detect outputs from the measurement circuit 1220. The signal processing module 1232 may include electronic components configured to a establish communication link between the WMD and the server, where the established communication may facilitate capture of portions of ECG data between the WMD and the server as described above. Accordingly, configuration and comparison of portions of ECG data may be facilitated in accordance with one or more embodiments.

In another example, advice module 1234 may provide advice based, at least in part, on outputs of signal processing module 1232. The advice module 1234 may include an algorithm such as, but not limited to, Shock Advisory Algorithm, implement decision rules, and so on. For example, the advice may be to shock, to not shock, to administer other forms of therapy, provide an indication to confirm a health status of the person 1280 (e.g., determine whether the person 1280 is experiencing perfusing or non-perfusing ventricular tachycardia (VT), and so on. If the advice is to shock, some defibrillator examples may report the advice to the user and prompt them to do it. In other examples, the defibrillator device may execute the advice by administering the shock. If the advice is to administer CPR, the defibrillator 1200 may further issue prompts for administrating CPR, and so forth. Examples of Shock Advisory Algorithm may be found in U.S. patent application Ser. No. 15/421,165, filed Jan. 31, 2017 (now issued as U.S. Pat. No. 10,016,614) titled Wearable cardioverter defibrillator (WCD) system making shock/no shock determinations by aggregating aspects of multiple patient parameters, which is incorporated by reference in its entirety for all purposes.

The processor 11230 may include additional modules, such as module 1236 for various other functions such as, but not limited to, ECG data capture 1036, as described herein.

In an example, the defibrillator device 1200 may include a memory 1238, which may work together with the processor 1230. The memory 1238 may be implemented in a wide variety of manners. For example, the memory 1238 may be implemented such as, but not limited to, nonvolatile memories (NVM), read-only memories (ROM), random access memories (RAM), and so forth or any combination thereof. The memory 1238 may include programs for the processor 1230, and so on. For example, the memory 1238 may include ECG signals for determining a respiration rate post-event. The programs may include operational programs executed by the processor 1230 and may also include protocols and methodologies so that decisions may be made by advice module 1234. Additionally, the memory 1238 may store various prompts for the user 1280, etc. Moreover, the memory 1238 may store a wide variety of information (i.e., predetermined parameter data) such as, but not limited to information regarding the person 1280.

The defibrillator 1200 may also include a power source 1240. In order to facilitate portability of defibrillator device 1200, the power source 1240 may include a battery type device. A battery type device may be implemented as a battery pack, which may be rechargeable or not-rechargeable. At times, a combination of rechargeable and non-rechargeable battery packs may be utilized. Examples of power source 1240 may include AC power override, where AC power may be available, and so on. In some examples, the processor 1230 may control the power source 1240.

Additionally, the defibrillator device 1200 may include an energy storage module 1250. The energy storage module 1250 may be configured to store some electrical energy (e.g., when preparing for sudden discharge to administer a shock). The energy storage module 1250 may be charged from the power source 1240 to an appropriate level of energy, as may be controlled by the processor 1230. In some implementations, the energy storage module 1250 may include one or more capacitors 1252, and the like.

The defibrillator 1200 may include a discharge circuit 1255. The discharge circuit 1255 may be controlled to facilitate discharging of the energy stored in energy storage module 1250 to the nodes 1214 and 1218. The discharge circuit 1255 may include one or more switches 1257. The one or more switches 1257 may be configured in a number of manners such as, but not limited to, an H-bridge, and so forth.

The defibrillator device 1200 may further include a user interface 1270 for the user 1280. The user interface 1270 may be implemented in a variety of manners. For example, the user interface 1270 may include a display screen capable of displaying what is detected and measured, provide visual feedback to the user 1280 for their resuscitation attempts, and so forth. The user interface 1270 may also include an audio output such as, but not limited to, a speaker to issue audio prompts, etc. The user interface 1270 may additionally include various control devices such as, but not limited to, pushbuttons, keyboards, switches, track pads, and so forth. Additionally, the discharge circuit 1255 may be controlled by the processor 1230 or directly by the user 1080 via the user interface 1270, and so forth.

Additionally, the defibrillator device 1200 may include other components. For example, a communication module 1290 may be provided for transmitting ECG signals stored on the defibrillator device 1200 to be downloaded and processed as described above. Such communication may be performed wirelessly, or via wire, or by infrared communication, near field communication (NFC), Bluetooth, WiFi, and so forth. Accordingly, information may be communicated, such as person data, incident information, therapy attempted, CPR performance, ECG information, and so forth.

A feature of a defibrillator device may be CPR related prompting. CPR prompts may be issued to the user 1280 visually or by audio facilitating assistance in the administration of CPR by the user 1280. Examples may be found in U.S. Pat. Nos. 6,334,070 and 6,356,785.

It should be appreciated after review of this disclosure that it is contemplated within the scope and spirit of the present disclosure that the claimed subject matter may include a wide variety of healthcare devices. Accordingly, the claimed subject matter is not limited in these respects.

Some portions of the foregoing detailed description are presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm is here, and generally, considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussion utilizing terms such as "processing," "computing," "calculating," "determining" or the like refer to actions or processes of a computing device that manipulates or transforms data represented as physical electronic or magnetic quantities within memories, registers, or other information storage devices, transmission devices, or display devices of the computing device.

Claimed subject matter is not limited in scope to the particular implementations described herein. For example, some implementations may be in hardware, such as those employed to operate on a device or combination of devices, for example, whereas other implementations may be in software and/or firmware. Likewise, although claimed subject matter is not limited in scope in this respect, some implementations may include one or more articles, such as a signal bearing medium, a storage medium and/or storage media. This storage media, such as CD-ROMs, computer disks, flash memory, or the like, for example, may have instructions stored thereon that, when executed by a computing device such as a computing system, computing platform, or other system, for example, may result in execution of a processor in accordance with claimed subject matter, such as one of the implementations previously described, for example. As one possibility, a computing device may include one or more processing units or processors, one or more input/output devices, such as a display, a keyboard and/or a mouse, and one or more memories, such as static random access memory, dynamic random access memory, flash memory, and/or a hard drive.

There is little distinction left between hardware and software implementations of aspects of systems; the use of hardware or software is generally (but not always, in that in certain contexts the choice between hardware and software can become significant) a design choice representing cost vs. efficiency tradeoffs. There are various vehicles by which processes and/or systems and/or other technologies described herein can be affected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the skill of one of skilled in the art in light of this disclosure. In addition, those skilled in the art will appreciate that the mechanisms of the subject matter described herein are capable of being distributed as a product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a flexible disk, a hard disk drive (HDD), a Compact Disc (CD), a Digital Versatile Disk (DVD), a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

Reference in the specification to "an implementation," "one implementation," "some implementations," or "other implementations" may mean that a particular feature, structure, or characteristic described in connection with one or more implementations may be included in at least some implementations, but not necessarily in all implementations. The various appearances of "an implementation," "one implementation," or "some implementations" in the preceding description are not necessarily all referring to the same implementations.

While certain exemplary techniques have been described and shown herein using various methods and systems, it should be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter is not limited to the particular examples disclosed, but that such claimed subject matter also may include all implementations falling within the scope of the appended claims, and equivalents thereof.

What is claimed:

1. A wearable medical device (WMD) system, comprising:
   a remote device;
   a wearable medical device (WMD), the WMD configured to communicate electrocardiogram (ECG) data to the remote device; and
   a configurable comparator module (CCM), the CCM configured to:
      capture a first portion of the ECG data based on a predetermined parameter, the first portion of the ECG data indicative of a non-episode portion of the ECG data,
      capture a second portion of the ECG data, the second portion of the ECG data indicative of an episode portion of the ECG data,
      cause to display at least the first portion and the second portion of the ECG data concurrently,
      facilitate selection of a portion among the displayed first portion and the displayed second portion of the ECG data, and
      automatically identify a type of rhythm corresponding to the selected portion of the ECG data for comparison by a user for use in a medical diagnosis.

2. The WMD system of claim 1, wherein the CCM is hosted on the remote device.

3. The WMD system of claim 1, wherein the predetermined parameter comprises a user selectable parameter.

4. The WMD system of claim 1, wherein the CCM is further configured to capture a third portion of the ECG data and cause to display the third portion of the ECG data concurrently with the first portion and the second portion of the ECG data, and wherein an R-wave peak of the third portion of the ECG data is aligned with R-wave peaks of the first portion and the second portion of the ECG data.

5. The WMD system of claim 4, wherein the third portion of the ECG data comprises a user selectable portion.

6. The WMD system of claim 1, wherein the predetermined parameter comprises an event detected by the WMD.

7. The WMD system of claim 6, wherein the second portion of the ECG data comprises a preceding portion of the ECG data, and wherein the preceding portion is captured a predetermined amount of time preceding the detected event.

8. The WMD system of claim 1, wherein the WMD comprises a wearable cardioverter defibrillator (WCD).

9. The WMD system of claim 1, wherein the predetermined parameter comprises a periodic trigger.

10. The WMD system of claim 1, wherein the second portion of the ECG data comprises a baseline portion of the ECG data, the baseline portion of the ECG data being a baseline portion captured during a non-episodic normal sinus rhythm.

11. The WMD system of claim 10, wherein the baseline portion of the ECG data comprises the non-episodic normal sinus rhythm captured during an exercising heart rate.

12. The WMD system of claim 10, wherein the baseline portion of the ECG data comprises the non-episodic normal sinus rhythm captured during a sleeping heart rate.

13. The WMD system of claim 10, wherein the baseline portion of the ECG data comprises the non-episodic normal sinus rhythm captured during a sitting heart rate.

14. The WMD system of claim 1, wherein the CCM is configured to cause to display the first portion and the second portion of the ECG data overlayed on top of each other.

15. The WMD system of claim 14, wherein the first portion and the second portion of the ECG data comprises user interactable first portion and second portion.

16. The WMD system of claim 1, wherein the CCM is configured to cause to display so that an R-wave peak of the first portion of the ECG data is aligned with an R-wave peak of the second portion of the ECG data.

17. The WMD system of claim 1, wherein to capture the first portion of the ECG data, the CCM is configured to determine whether the first portion is the non-episode portion of the ECG data, and wherein to capture the second portion of the ECG data, the CCM is configured to determine whether the second portion is the episode portion of the ECG data.

18. A wearable medical device (WMD) system, comprising:
a remote device;
a WMD configured to communicate electrocardiogram (ECG) data to the remote device;
means for capturing a first portion and a second portion of the ECG data, the first portion being indicative of a non-episode portion of the ECG data and the second portion being indicative of an episode portion of the ECG data,
means for displaying at least the first portion and the second portion of the ECG data concurrently,
means for facilitating selection of a portion among the displayed first portion and the displayed second portion of the ECG data, and
means for automatically identifying a type of rhythm corresponding to the selected portion of the ECG data for comparison by a user for use in a medical diagnosis.

19. The WMD system of claim 18, wherein the means for capturing and the means for displaying are hosted on the remote device.

20. The WMD system of claim 18, wherein the second portion of the ECG data comprises a baseline portion of the ECG data, the baseline portion being a baseline portion during a non-episodic normal sinus rhythm.

21. The WMD system of claim 18, wherein the means for displaying comprises a means for displaying the first portion and the second portion of the ECG data overlayed on top of each other.

22. The WMD system of claim 18, wherein the means for displaying comprises means for displaying the first portion and the second portion of the ECG data concurrently so that an R-wave peak of the first portion of the ECG data is aligned with an R-wave peak of the second portion of the ECG data.

* * * * *